United States Patent
Chung et al.

(10) Patent No.: US 7,203,028 B2
(45) Date of Patent: Apr. 10, 2007

(54) SETTLING SERVO CONTROL METHOD AND APPARATUS FOR HARD DISC DRIVE AND METHOD AND APPARATUS FOR ESTIMATING ACCELERATION CONSTANT OF VOICE COIL MOTOR ACTUATOR SUITABLE FOR THE SETTLING SERVO CONTROL METHOD AND APPARATUS

(75) Inventors: Da-woon Chung, Suwon-si (KR);
Chang-Ik Kang, Jeju-si (KR);
Chan-hyuck Boo, Jeju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 10/462,803

(22) Filed: Jun. 17, 2003

(65) Prior Publication Data
US 2004/0114270 A1 Jun. 17, 2004

(30) Foreign Application Priority Data
Dec. 16, 2002 (KR) ...................... 10-2002-0080113

(51) Int. Cl.
*G11B 5/596* (2006.01)
(52) U.S. Cl. ................................. 360/78.06; 360/78.09
(58) Field of Classification Search .................. 360/75, 360/78.06, 78.04, 78.07, 78.08, 78.09
See application file for complete search history.

(56) References Cited

U.S. PATENT DOCUMENTS

| | | | | |
|---|---|---|---|---|
| 4,679,103 A * | 7/1987 | Workman | ................. | 360/78.07 |
| 5,510,939 A * | 4/1996 | Lewis | ..................... | 360/78.09 |
| 5,898,286 A * | 4/1999 | Clare et al. | .................. | 318/569 |
| 6,501,613 B1 * | 12/2002 | Shih | ......................... | 360/78.06 |
| 6,545,838 B1 * | 4/2003 | Burton | .................... | 360/78.06 |
| 2004/0017632 A1 * | 1/2004 | Horiguchi et al. | ....... | 360/78.06 |

FOREIGN PATENT DOCUMENTS

| JP | 10-149643 | 6/1998 |
|---|---|---|
| JP | 2002-505494 | 2/2002 |

OTHER PUBLICATIONS

Japanese Patent Office Action for corresponding Japanese Patent Application No. 2002-365862 dated Aug. 9, 2005.

* cited by examiner

*Primary Examiner*—Andrew L. Sniezek
(74) *Attorney, Agent, or Firm*—Staas & Halsey LLP

(57) ABSTRACT

A fast settling servo control method and apparatus for a hard disc drive and a method and apparatus estimate an acceleration coefficient of a voice coil motor (VCM) actuator suitable for the settling servo control method and apparatus for disc drives, which allow a head to stably and rapidly move to a target track when a track seek operation is performed in the hard disk drive. The settling servo control apparatus includes a state estimator which estimates position information of a head, velocity information of the head, voice coil motor (VCM) current information, and external disturbance information based on a position error signal (PES); a feedback gain multiplier which respectively multiplies the position information of the head and the velocity information of the head by predetermined feedback control gains each and outputs the multiplication results as feedback control inputs; a pulse generator which generates a pulse signal used for cancellation of slow poles with reference to at least one of initial VCM current information, initial external disturbance information, and previous control input information as well as initial position information of a head and initial velocity information of the head; and an adder which sums the feedback control inputs, the external disturbance information, and the pulse signal generated from the pulse generator and outputs the summation result to a voice coil motor (VCM) actuator as a control input.

32 Claims, 14 Drawing Sheets

SETTLING SERVO CONTROL METHOD
AND APPARATUS FOR HARD DISC DRIVE
AND METHOD AND APPARATUS FOR
ESTIMATING ACCELERATION CONSTANT
OF VOICE COIL MOTOR ACTUATOR
SUITABLE FOR THE SETTLING SERVO
CONTROL METHOD AND APPARATUS

CROSS-REFERENCE TO RELATED
APPLICATIONS

This application claims the benefit of Korean Application No. 2002-80113, filed Dec. 16, 2002, in the Korean Intellectual Property Office, the disclosure of which is incorporated herein by reference.

BACKGROUND OF THE INVENTION

1. Field of the Invention

The present invention relates to a servo controller for a hard disc drive, and more particularly, to a fast settling servo control method and apparatus for a hard disc drive and a method and apparatus for estimating an acceleration coefficient of a voice coil motor (VCM) actuator suitable for the settling servo control method and apparatus for the hard disc drive, which allow a head to move stably and rapidly to a target track when a track seek operation is performed in the hard disk drive.

2. Description of the Related Art

A hard disk drive is an apparatus that reads/writes data from/on a hard disk. Data is stored in a concentric circular track on a disk surface, and for storage and data seeking purposes, the track is divided into a plurality of sectors. Information on locations of the sectors is expressed by specified identifiers such as a cylinder (or the track), a head used to access the disk surface, and a sector number.

A disk is rotated by a spindle motor, and the data is accessed by the head, including read/write heads on an actuator arm.

The hard disk drive operates in two modes, the first of which is called a seek mode, in which the head moves from an initial track to a target track, and the second of which is called a track following mode, in which the head is accurately positioned on a data line of the track after the head has reached the target track.

A track seek control operation is performed in the disk drive for the purpose of rapidly moving the head from a current position to a target position. In the prior art, the track seek control operation is performed in two modes, that is, an acceleration/deceleration control mode and a settling control mode. The track seek control operation has been disclosed in U.S. Pat. No. 6,118,616 issued on Sep. 12, 2000, U.S. Pat. No. 6,046,878 issued on Apr. 4, 2000, Korean Pat. No. 2001-41307 issued on May 15, 2001, and Korean Pat. No. 1997-71731 issued on Nov. 11, 1997.

In the acceleration/deceleration control mode, a voice coil motor (VCM) actuator is accelerated or decelerated, so that the head moves near the target track. In the settling control mode, the head rapidly and accurately moves to a center of the target track after the end of the acceleration/deceleration control mode.

However, a current velocity of the head and a current position of the head may vary with a distance from the current position to the target position, in both direction and magnitude, at the time when the settling control mode starts. A variation in an initial value such as the current velocity of the head or the current location of the head causes overshoot or undershoot relative to the center of the target track, which results in an increase in a settling time and a fatal error such as off-track writing.

Therefore, there is a need to develop a new settling servo control apparatus that moves the head to the center of the target track rapidly and accurately without causing overshoot or undershoot, irrespective of a current state of the head.

In the prior art, there have been efforts to improve settling performance by cancellation of poles using addition of zeros in the transfer function of the VCM actuator.

Correct information on the VCM actuator and the settling servo control apparatus is required for cancellation of poles and addition of zeros. However, the prior art does not consider real factors such as dynamic characteristics of a power-amplifier and the effect of a delay in a control signal, which is generated by operations of a microprocessor or a digital signal processor, in a designing process of the settling servo control apparatus. Thus, the accuracy of the cancellation of poles is degraded.

In addition, in the prior art, the amplitude of a pulse signal applied to the VCM actuator for cancellation of poles is strong, which stimulates a high-frequency vibration mode of the VCM actuator.

An acceleration coefficient of the VCM actuator varies with the hard disk drive due to various manufacturing environments. Even in the same kind of hard disk drives, the acceleration coefficient of the VCM actuator varies with a position of the VCM actuator, a direction of a VCM current, or an ambinient temperature.

The prior art does not consider such a variation in the acceleration coefficient, and thus the accuracy of the cancellation of poles using addition of zeros is not degraded.

SUMMARY OF THE INVENTION

Additional aspects and/or advantages of the invention will be set forth in part in the description which follows and, in part, will be obvious from the description, or may be learned by practice of the invention.

The present invention provides a settling servo control method to move a head rapidly and accurately to a center of a target track, irrespective of a distance from an initial track to a target track and a direction in which the head moves, when a track seek operation is performed.

The present invention also provides a settling servo control apparatus suitable for the settling servo control method.

The present invention also provides a settling servo control method for a hard disk drive.

The present invention also provides a method of estimating and compensating for an acceleration coefficient of a voice coil motor (VCM) actuator suitable for the settling servo control apparatus.

The present invention also provides a hard disk drive suitable for the method of estimating the acceleration coefficient of the VCM actuator.

According to an aspect of the present invention, a settling servo control method for a hard disk drive is provided in which a pulse signal is applied to a voice coil motor (VCM) actuator for cancellation of slow poles at the beginning of a settling control mode, wherein the amplitude of the pulse signal is determined with reference to at least one of the initial VCM current information, the initial external disturbance information, and the previous control input information, as well as the initial position information of a head and the initial velocity information of the head.

According to another aspect of the present invention, a settling servo control method for a hard disk drive is provided in which pulse signals are applied to a voice coil motor (VCM) actuator for cancellation of slow poles at the beginning of a settling control mode, wherein the pulse signals are consecutively applied to the VCM actuator during sampling periods of a position error signal (PES) from the beginning of the settling control mode.

The pulse signals may be consecutively applied to the VCM actuator during two sampling periods of the PES from the beginning of the settling control mode.

The amplitudes of the pulse signals may be determined with reference to at least one of the initial VCM current information, the initial external disturbance information, and the previous control input information, as well as the initial position information of a head and the initial velocity information of the head.

The amplitudes of the pulse signals during first and second sampling periods of the PES are determined based on the first sampling of the PES. The amplitude of the pulse signal applied during the first sampling period of the PES is determined based on a first sampling of the PES, and the amplitude of the pulse signal applied during the second sampling period of the PES is determined based on a second sampling of the PES.

According to yet another aspect of the present invention, a settling servo control method for a hard disk drive comprises obtaining a position error signal (PES) indicating a current position of a head if a settling control mode starts; estimating position information of the head, velocity information of the head, voice coil motor (VCM) current information, and external disturbance information with reference to the PES; respectively multiplying the position information of the head and the velocity information of the head by control gains and outputting the multiplication results and the external disturbance as feedback control signals; generating pulse signals used for cancellation of slow poles at the beginning of the settling control mode, adding the pulse signals to the feedback control signals, and outputting the summation result as a control input, where the pulse signals are consecutively applied during first and second sampling periods of the PES of the settling control mode; and driving a VCM actuator by using the control input.

According to yet another aspect of the present invention, a settling servo control method uses a settling servo control apparatus having a state estimator which estimates position information of a head, velocity information of the head, voice coil motor (VCM) current information, and external disturbance information based on a position error signal (PES); a feedback gain multiplier which multiplies the position information of the head and the velocity information of the head respectively by predetermined feedback control gains and outputs the multiplication results as feedback control inputs; a pulse generator which generates pulse signals used for cancellation of slow poles with reference to at least one of initial VCM current information, initial external disturbance information, and previous control input information, as well as initial position information of a head and initial velocity information of the head; and an adder which sums the feedback control inputs, the external disturbance information, and the pulse signal generated from the pulse generator and outputs the summation result to a voice coil motor (VCM) actuator as a control input, the settling servo control method comprising obtaining a position error signal (PES) indicating a current position of a head when a settling control mode starts; determining the position information of the head, the velocity information of the head, the VCM current information, and the external disturbance information by inputting the PES to the state estimator; obtaining control inputs by inputting outputs of the state estimator to the feedback gain multiplier; during a first sampling period of the PES of the settling control mode, generating a pulse signal used for cancellation of slow poles by inputting the position information of the head, the velocity information of the head, the VCM current information, the external disturbance information, and the previous control input information outputted from the state estimator to the pulse generator, summing the pulse signal, the feedback control inputs outputted from the feedback gain multiplier, and the external disturbance information outputted from the state estimator by the adder, determining a control input, applying the control input, which drives the VCM actuator, to a power amplifier, holding a process until a next sampling period of the PES starts, and going to an operation of obtaining the PES; during a second sampling period of the PES of the settling control mode, generating a pulse signal used for cancellation of slow poles by inputting the position information of the head, the velocity information of the head, the VCM current information, the external disturbance information, and the previous control input information outputted from the state estimator to the pulse generator, summing the pulse signal, the feedback control inputs outputted from the feedback gain multiplier, and the external disturbance information outputted from the state estimator by the adder, determining a control input, applying the control input, which drives the VCM actuator, to the power amplifier, holding a process until a next sampling period of the PES starts, and going to an operation of obtaining the PES; and during other sampling periods of the PES of the settling control mode, summing the feedback control inputs outputted from the feedback gain multiplier and the external disturbance information outputted from the state estimator by the adder, determining a control input, applying the control input, which drives the VCM actuator, to the power amplifier, holding a process until the next sampling period of the PES starts, and going to an operation of obtaining the PES.

Here, the pulse signal having the amplitude determined based on a first sample of the PES is generated during the second sampling period of the PES of the settling control mode; the pulse signal, the feedback control inputs outputted from the feedback gain multiplier, and the external disturbance information outputted from the state estimator are summed by the adder; a control input is determined; and the control input is applied to the power amplifier.

According to yet another aspect of the present invention, a method of estimating and compensating for acceleration coefficients of a voice coil motor (VCM) actuator of a hard disk drive comprises selecting tracks which are separated by a predetermined interval on a disk; and estimating the acceleration coefficients while a head moves between the selected tracks with a VCM current applied to the VCM actuator.

According to yet another aspect of the present invention, a hard disk drive comprises a state estimator which estimates position information of a head, velocity information of the head, voice coil motor (VCM) current information, and external disturbance information with reference to a position error signal (PES); a feedback gain multiplier which multiplies the position information of the head and the velocity information of the head respectively by predetermined feedback control gains and outputs the multiplication results as feedback control inputs; an adder which sums the feedback control inputs, the external disturbance information, and the pulse signal generated from the pulse generator and outputs the summation result to a voice coil motor (VCM) actuator as a control input; an acceleration coefficient identifier which estimates acceleration coefficients of the VCM actuator with reference to the velocity information of the head, the VCM current information, and the external disturbance information estimated by the state estimator, and the previous control input information, or outputs the estimated value of the acceleration coefficient; and an acceleration coefficient compensator which compensates for variation in the acceleration coefficients by multiplying the control input outputted from the adder by a ratio of an estimated value of the acceleration coefficient to a representative acceleration coefficient, i.e., a ratio of $\hat{K}_a$ to $K^*_a$.

According to yet another aspect of the present invention, a method of controlling a servo of a hard disk drive comprises moving a head among selected tracks on a disk; obtaining a position error signal (PES) and generating a control input used to drive a voice coil motor (VCM) actuator by obtaining position information of the head, velocity information of the head, and external disturbance information estimated by a state estimator based on the PES; if an acceleration coefficient estimation mode is set, multiplying the control input by 1, applying the multiplication result to the VCM actuator, storing velocity information of the head, VCM current information, external disturbance information, previous control input information, and a control input, which are used for estimation of an acceleration coefficient and are obtained from the state estimator, in a memory, estimating the acceleration coefficient by using N data samples used for estimation, and storing the estimated value of the acceleration coefficient in the memory; if estimation of the acceleration coefficient is completed in all selected tracks, finishing the acceleration coefficient estimation mode; if the acceleration coefficient estimation mode is not set, reading the estimated value of the acceleration coefficient in a current track from the memory to compensate for variation in the acceleration coefficient; and multiplying the control input by a ratio of the estimated value of the acceleration coefficient to a representative acceleration coefficient and applying the multiplication result to the VCM actuator.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
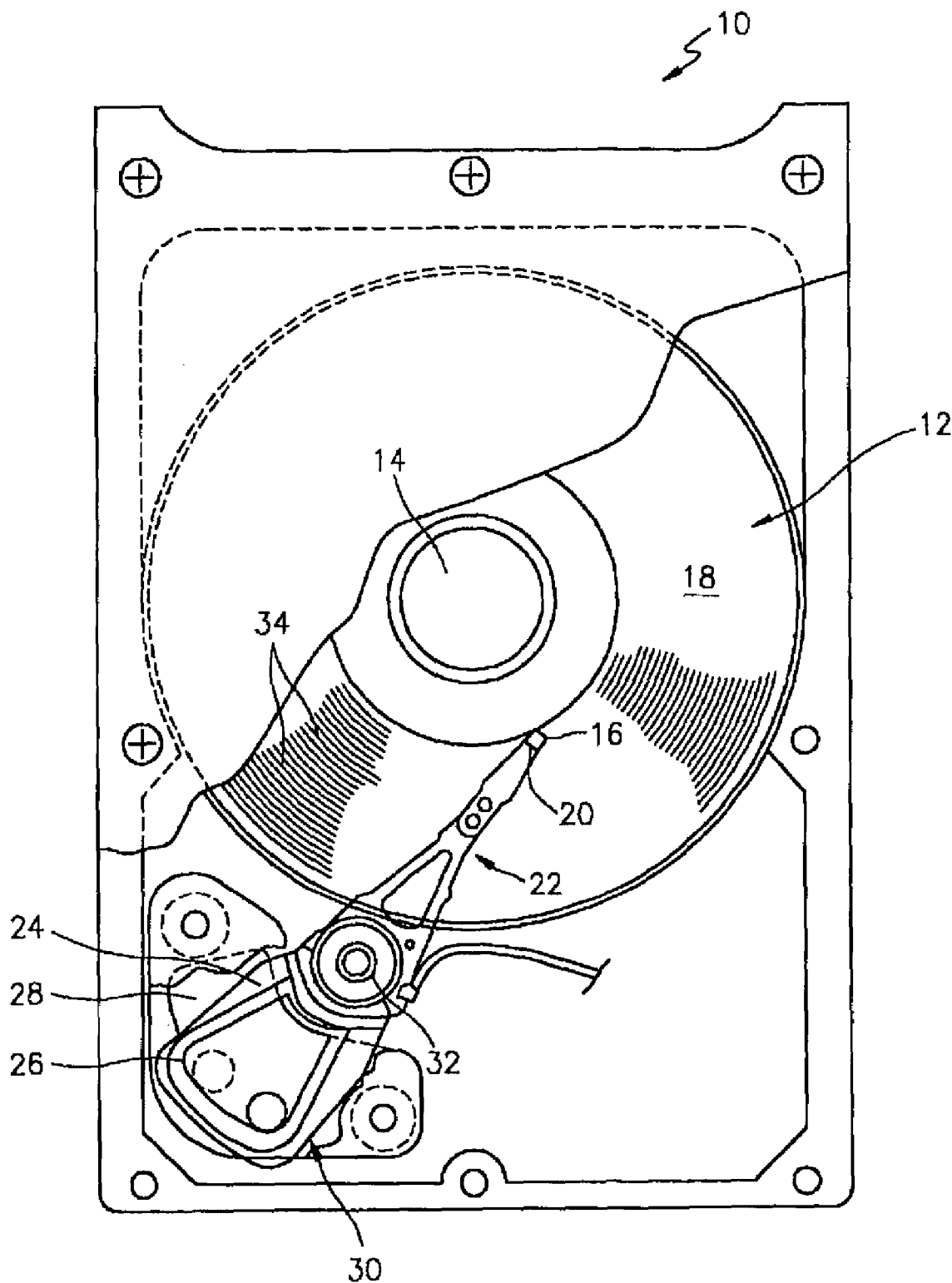
FIG. 1 illustrates a configuration of a conventional hard disk drive 10.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The present invention proposes a settling servo control method and apparatus to improve, distinctively, settling performance by accurately cancelling out slow poles. To effectively cancel out the slow poles, real factors such as dynamic characteristics of a power amplifier and the effect of a delay in a control signal are considered in a designing process of a controller. In addition, a method of controlling the amplitudes of pulse signals applied to a voice coil motor (VCM) actuator is proposed in the present invention to prevent the VCM actuator from vibrating when the amplitudes of the pulse signals are significant. Besides, an adaptive control method is proposed in the present invention, where a variation in an acceleration coefficient is accurately estimated and compensated for and durability of the controller against the variation in the acceleration coefficient of the VCM actuator is improved.

FIG. 1 illustrates a configuration of a conventional hard disk drive 10. The hard disk drive 10 includes at least one magnetic disk 12 rotated by a spindle motor 14. The hard disk drive 10 also includes a head 16 positioned adjacent to a disk surface 18.

The head 16 reads data from, or writes data to, the disk 12 by sensing a magnetic field from the disk 12 or creating a magnetic field in the disk 12. Typically, the head 16 is placed on the disk surface 18. Although only one head 16 is presented in FIG. 1, it should be understood that the head 16 includes a write head to create the magnetic field in the disk 12 and a read head for sensing the magnetic field from the disk 12. In the prior art, the read head includes a magneto-resistive (MR) device.

The head 16 may be included in a slider 20. The slider 20 creates an air bearing between the head 16 and the disk surface 18. The slider 20 is coupled to a head gimbal assembly 22. The head gimbal assembly 22 is attached to an actuator arm 24 having a voice coil 26. The voice coil 26 is positioned adjacent to a magnetic assembly 28 shaping a voice coil motor (VCM) 30. A VCM current supplied to the voice coil 26 generates torque which causes the actuator arm 24 to rotate with respect to a bearing assembly 32. The rotation of the actuator arm 24 allows the head 16 to move across the disk surface 18.

Typically, data is stored in concentric circular tracks 34 of the disk 12. In the prior art, each of the tracks 34 includes a plurality of sectors, and each sector includes a data field and an identification field. The identification field consists of gray codes used to identify sectors and tracks (cylinders). In addition, servo marks are recorded at a predetermined interval, so that a position of the head 16 can be accurately determined. The head 16 moves across the disk surface 18 to read data from, or write data to, another track. In the prior art, the process of moving the head 16 across the disk surface 18 is called as a seek routine.

Figure 2:
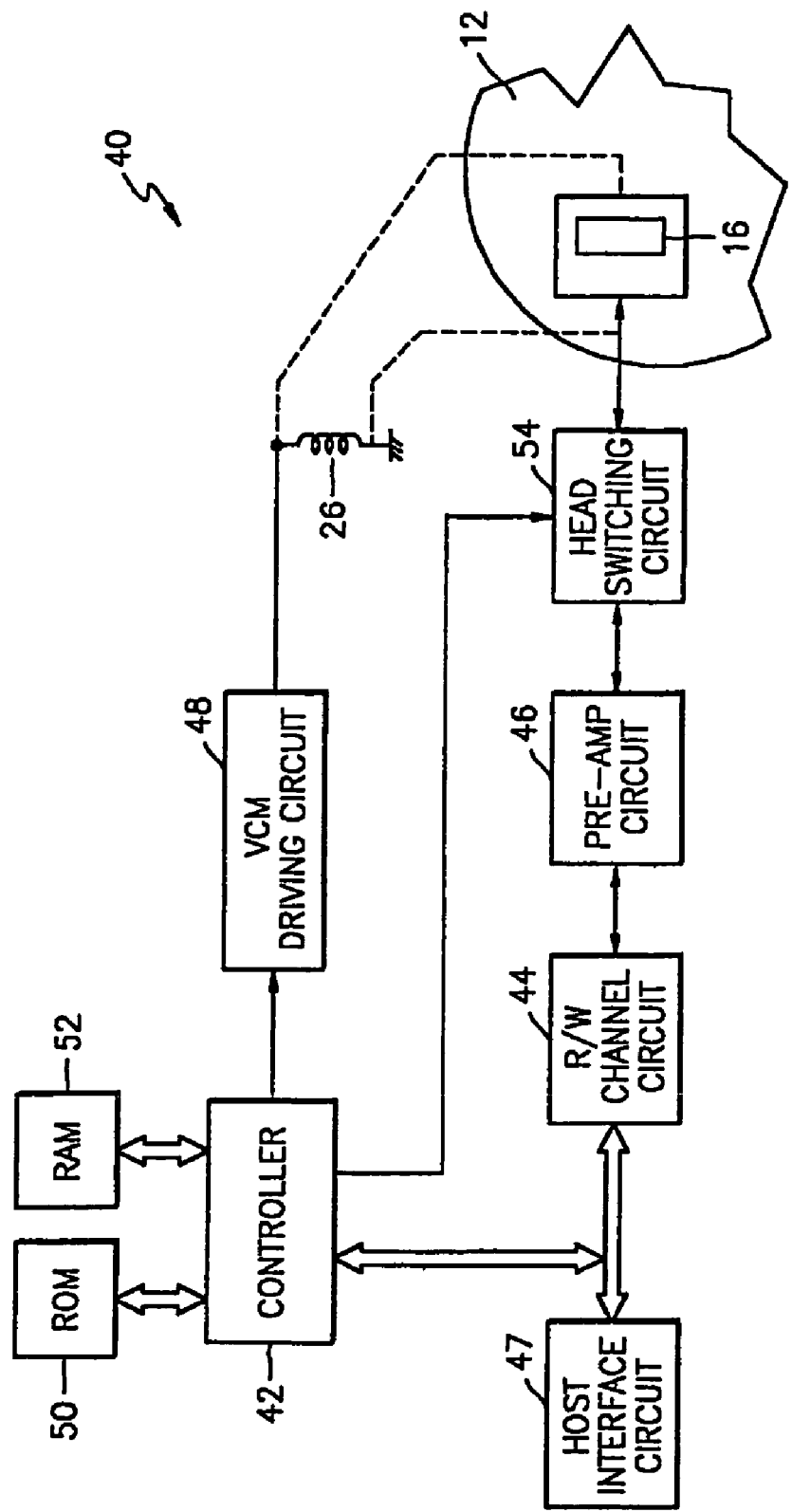
FIG. 2 illustrates a system 40 which controls the hard disk drive 10 of FIG. 1.

FIG. 2 illustrates a system 40 which controls the hard disk drive 10 of FIG. 1. The system 40 includes a controller 42 which is coupled to the head 16 through a read/write (R/W) channel circuit 44, a pre-amp circuit 46, and a head switching circuit 54. The controller 42 may be a digital signal processor (DSP), a microprocessor, or a micro controller.

The controller 42 supplies the read/write channel 44 with a control signal to read data from, or write data to, the disk 12. Typically, the data is transmitted from the read/write channel 44 to a host interface circuit 47. The host interface circuit 47 includes a buffer memory and a control circuit which allow the hard disk drive 10 to interface with the system such as a personal computer (PC).

The controller 42 is also coupled to a VCM driving circuit 48 which supplies the voice coil 26 with the VCM current. The controller 42 supplies the VCM drive circuit 48 with another control signal to control movements of an exciter (not shown) of the VCM 30 and the head 16.

In a reproduction mode, the read/writer channel circuit 44 modulates an analog signal, which is read by the head 16 and amplified by the pre-amp circuit 46, into a digital signal readable by a host computer (not shown), outputs the digital signal, receives user data from the host computer (not shown) through the host interface circuit 47, converts the user data into a recording current recordable in the disk 12, and performs signal processing to output the recording current to the pre-amp circuit 46.

The controller 42 is coupled to a non-volatile memory 50 such as a read only memory (ROM) or a flash memory and a random access memory (RAM) 52. The non-volatile memory 50 and the RAM 52 include commands and data used by the controller 42 to execute a software routine. The software routine includes the seek routine in which the head 16 moves from a first track to another track. The seek routine includes a servo control routine to assure that the head 16 accurately moves to the target track.

Figure 3:
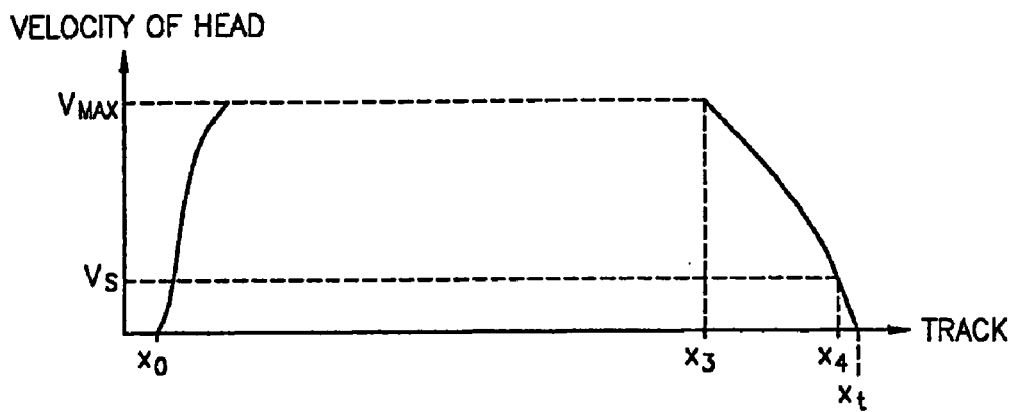
FIG. 3 is a graph showing changes in a velocity of a head during a seek mode.

FIG. 3 is a graph showing changes in a velocity of the head 16 during the seek mode. In FIG. 3, the velocity of the head 16 changes during the seek mode wherein the head 16 starts to move from an initial track x0 to a target track xt. The head 16 moves from the initial track x0 to a transition track x4 (a track at a predetermined distance, e.g., a distance of one track, from the initial track x0) while being controlled in the acceleration/deceleration control mode and moves from the transition track x4 to the target track xt while being controlled in the settling control mode.

In the acceleration/deceleration control mode where the head 16 moves from the initial target x0 to the transition track x4, the head 16 is accelerated to a maximum speed $V_{MAX}$ after leaving the initial track x0 and keeps moving to a deceleration track x3 at the maximum speed $V_{MAX}$. The deceleration track x3 is at a predetermined distance, e.g., a distance of 16 tracks, from the target track xt. The head 16 is decelerated after leaving the deceleration track x3 and is controlled in the settling control mode after reaching the transition track x4. In the settling control mode, the head 16 is rapidly settled on the target track xt.

Figure 4:
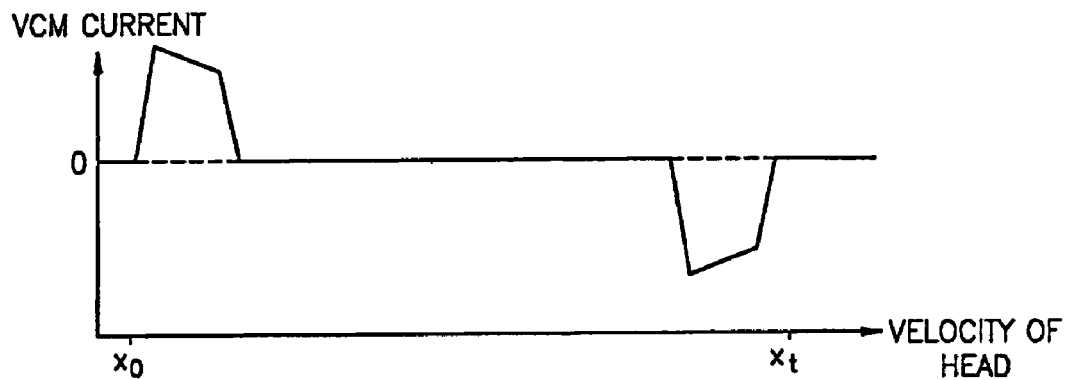
FIG. 4 is a graph showing changes in a voice coil motor (VCM) current applied to a VCM actuator during the seek mode.

FIG. 4 is a graph showing changes in the VCM current applied to the VCM actuator during the seek mode. A large amount of VCM current is applied to the VCM actuator, so that the head 16 is gradually accelerated while moving toward the target track xt from the initial track x0. If the head 16 starts to move at the maximum speed $V_{MAX}$, a smaller amount of VCM current is required for the head 16 to keep moving at the maximum speed $V_{MAX}$. If the head 16 reaches the deceleration track x3, a large amount of VCM current, which has an opposite polarity to the VCM current when the head 16 is accelerated, is applied to the VCM actuator, so that the head 16 is gradually decelerated moving toward the target track xt.

When the head 16 reaches the transition track x4 which is at a predetermined distance from the target track xt, an operation mode is converted to the settling control mode from the acceleration/deceleration control mode, and a settling servo control apparatus proceeds to settle the head 16 on the target track xt as soon as possible.

Here, preferably, the head 16 has a velocity $V_S$ as shown in FIG. 3 at the transition track xt when the deceleration control mode is converted to the settling control mode.

However, an initial velocity of the head 16 and an initial position of the head 16 at the beginning of the settling control mode vary with a distance from the initial position to a target position, in both direction and magnitude of the motion of the head 16 moves. Such variations in the initial velocity of the head 16 and the initial position of the head 16 cause an overshoot or an undershoot relative to a center of a target track, which results in an increase in a settling time and a fatal error, such as off-track writing.

Figure 5:
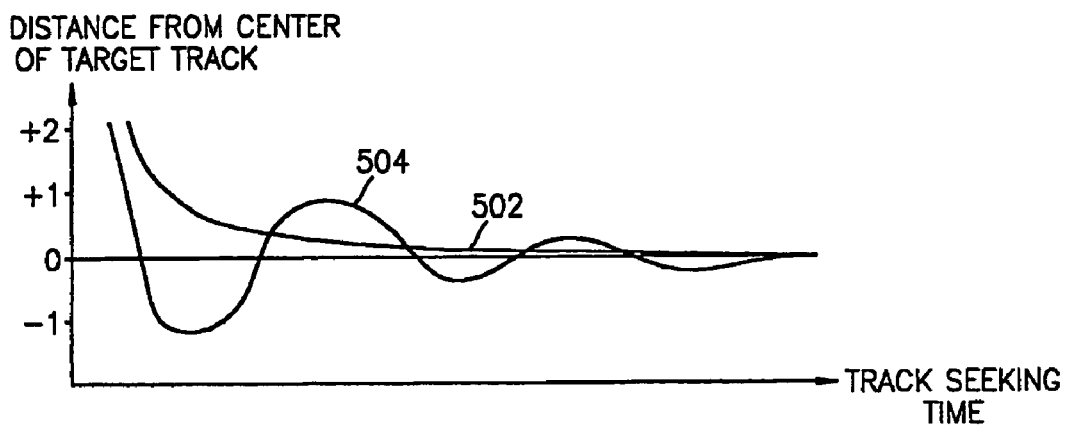
FIG. 5 is a graph showing a locus of movements of the head with an undershoot and an overshoot in a transition track.

FIG. 5 is a graph showing a locus of movements of the head 16 with involving an undershoot and an overshoot in the transition track x4. If the initial velocity of the head 16 is too low ($V<V_S$, V denotes the velocity of the head 16) in the transition track x4, the locus of movements of the head 16 are shown in FIG. 5 as an undershoot locus curve 502. Here, the head 16 does not have a velocity low enough to settle on the target track xt. On the contrary, when the initial velocity of the head 16 is too high ($V>V_S$) at the transition track x4, the locus of movements of the head 16 are shown in FIG. 5 as an overshoot locus curve 504. Here, the head 16 undesirably vibrates relative to the center of the target track xt.

Figure 6:
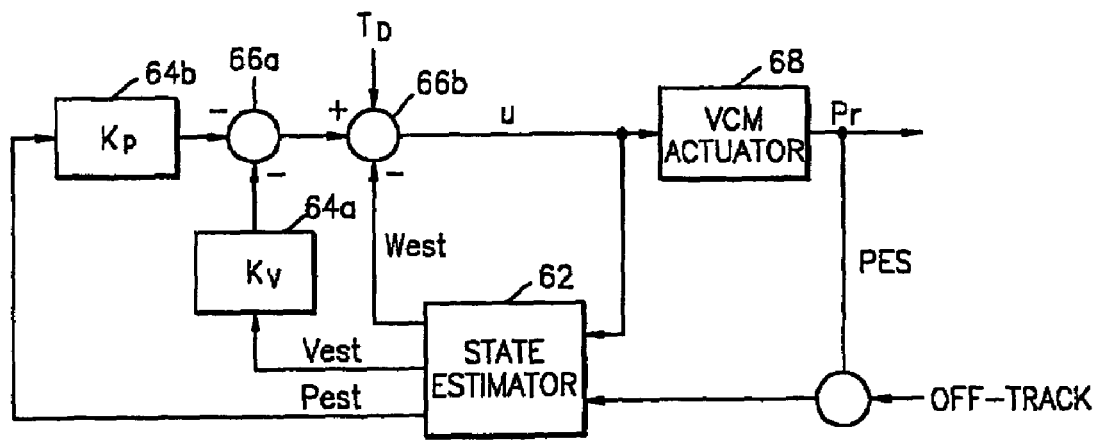
FIG. 6 is a block diagram of a conventional settling servo controller.

FIG. 6 is a block diagram of a conventional settling servo controller. The settling servo controller of FIG. 6 has been disclosed in U.S. Pat. No. 6,118,616, filed also by the applicant of the present invention. The settling servo controller of FIG. 6 includes a state estimator 62, feedback gain multipliers 64a and 64b, and adders 66a and 66b, and has no pole-cancellation.

The state estimator 62 estimates position information of a head, velocity information of the head, and external disturbance information with reference to a position error signal (PES). The feedback gain multipliers 64a and 64b each multiply the position information of the head 16 and velocity information of the head 16 by $K_P$ and $K_V$ and applies a control input to a VCM actuator 68. Here, $P_{est}$, $V_{est}$, and $W_{est}$ respectively denote the estimated position information of the head 16, the estimated velocity information of the head 16, and the estimated external disturbance information. The control input applied to the VCM actuator 68 is a conventional control input obtained by feedback.

The adder 66a sums outputs from the feedback gain multipliers 64a and 64b, and the adder 66b sums an output of the adder 66a and the estimated external disturbance information outputted from the state estimator 62.

Figure 7:
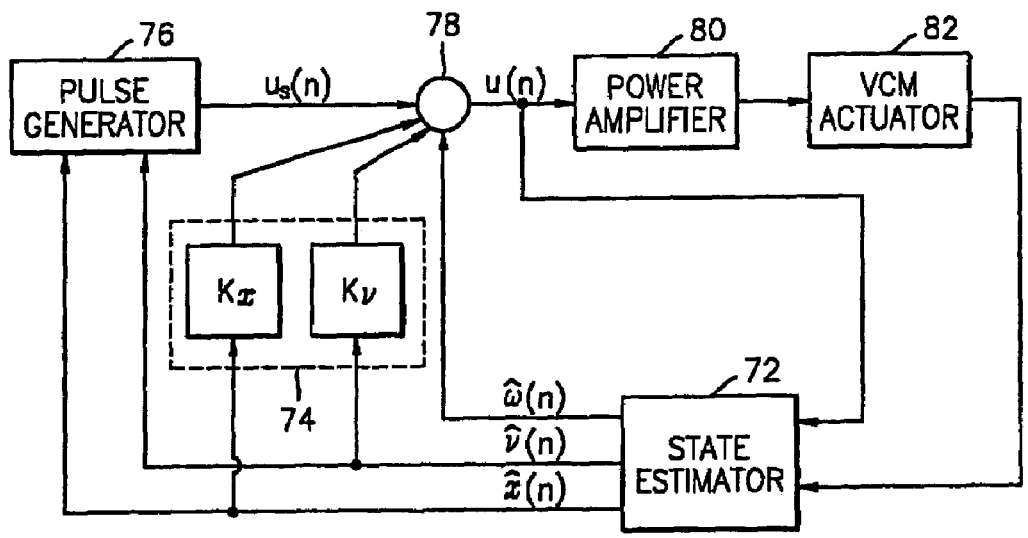
FIG. 7 is a block diagram of another conventional settling servo controller.

FIG. 7 is a block diagram of another conventional settling servo controller. The settling servo controller of FIG. 7 has no pole-cancellation, in contrast to FIG. 6. That is, the settling servo controller of FIG. 7 uses a pulse signal for cancellation of slow poles by using addition of zeros to improve a settling response.

Generally, the general settling servo controller has slow poles, which delays a response of the settling servo controller.

Figure 8:
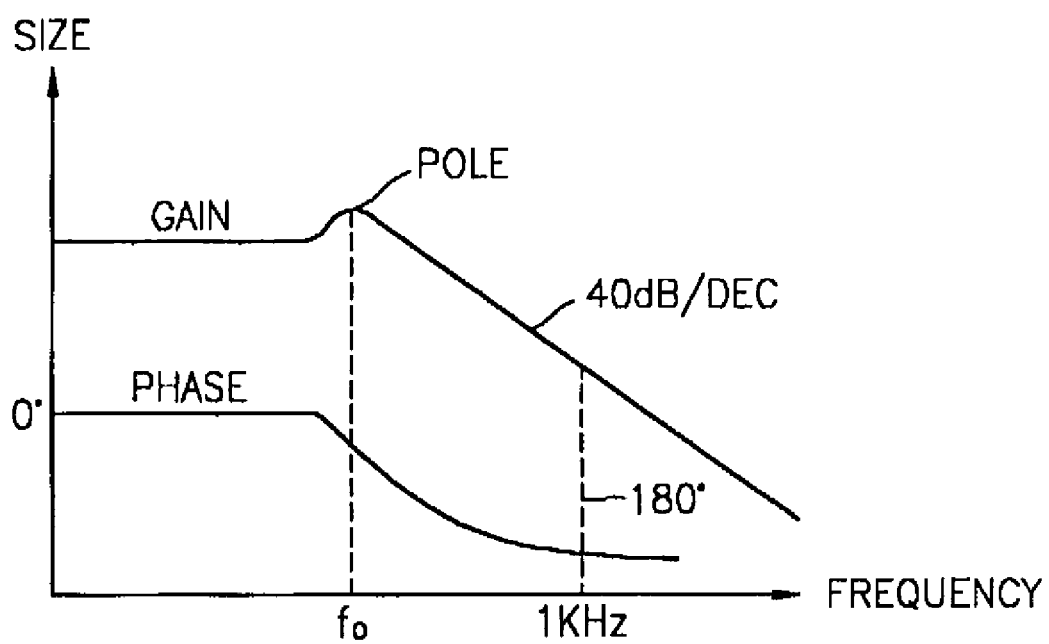
FIG. 8 is a Bode plot showing characteristics of the VCM actuator in accordance with an embodiment of the present invention.

FIG. 8 is a Bode plot showing gain-to-phase characteristics of the VCM actuator 68. As shown in FIG. 8, resonance occurs at frequency fo (a pole). Since radiation of a frequency occurs in the VCM actuator 68, it is not possible to accurately perform settling servo control and phase compensation, and thus the settling servo controller does not respond well to external shocks.

The settling servo controller of FIG. 7 improves the settling response by cancellation of slow poles using addition of zeros, the slow poles being generated by pulse signals applied to the VCM actuator 68 in the early stage of the settling control mode.

The settling servo controller of FIG. 7 includes a state estimator 72, a feedback gain multiplier 74, a pulse generator 76, and an adder 78.

The state estimator 72 estimates position information of a head, velocity information of the head, and external disturbance information with reference to a position error signal (PES). The feedback gain multiplier 74 multiplies the position information of the head and the velocity information of the head respectively by $K_\chi$ and $K_v$ and applies a control input to a VCM actuator 82. Here, $\hat{\chi}(n)$, $\hat{v}(n)$, and $\hat{\omega}(n)$ each denote estimated position information of the head, estimated velocity information of the head, and estimated external disturbance information during a $n^{th}$ sampling period of the PES.

The pulse generator 76 generates the pulse signal at the beginning of the settling control mode. Here, the amplitude of the pulse signal is obtained by multiplying initial position information $\hat{\chi}(0)$ and initial velocity information $\hat{v}(0)$ of the head at the beginning of the settling control mode respectively by predetermined constants $k_{s\chi}$ and $k_{sv}$ as follows:

$$u_s(n) = [k_{s\chi}\hat{\chi}(0) + k_{sv}\hat{v}(0)]\delta(n) \quad (1)$$

where $\delta(n)$ denotes the pulse signal having an amplitude of '1', and '0' denotes a time when the settling control mode starts.

The control input applied to the VCM actuator 82 is the sum of feedback control inputs and the pulse signal (calculated by using equation 1) generated by the pulse generator 76. The state estimator 72 estimates the position information of the head, the velocity information of the head, and the external disturbance information with reference to the PES, and the feedback gain multiplier 74 multiplies the position information of the head and the velocity information of the head estimated by the state estimator 72 respectively by feedback control gains and outputs the multiplication results to the adder 78 as feedback control inputs.

The pulse generator 76 obtains the initial position information of the head and the velocity information of the head from the state estimator 72 at the beginning of the settling control mode and generates the pulse signal by respectively multiplying the position information of the head and the velocity information of the head obtained from the state estimator 72 by predetermined constants $k_{s\chi}$ and $k_{sv}$.

The adder 78 sums outputs of the feedback gain multiplier 74, i.e. the feedback control inputs, the estimated external disturbance information $\hat{\omega}(n)$ from the state estimator 72, and a pulse signal $u_s(n)$ generated from the pulse generator 76.

Here, the pulse signal $u_s(n)$ is applied to the adder 78, so that the settling servo controller of FIG. 7 has an improved settling response to the position of the head by cancellation of slow poles using addition of zeros. The pulse signal $u_s(n)$ generated from the pulse generator 76 is added to the feedback control inputs and the external disturbance by the adder 78, and the summation result is outputted as a final control signal u(n) to a power amplifier 80. The power amplifier 80 receives the final control signal u(n) and supplies the VCM actuator 82 with a VCM current in response to the final control signal u(n).

The settling servo controller of FIG. 7 is introduced to improve performance of a settling servo by cancellation of slow poles using addition of zeros. Correct information on the settling servo controller is needed to accurately cancel out slow poles using addition of zeros.

However, the prior art does not consider real factors such as dynamic characteristics of a power amplifier and the effect of a delay in a control signal generated by operations of a microprocessor or a digital signal processor in a designing process of a controller. Thus, in the prior art, the accuracy of the cancellation of poles is degraded. In addition, vibration may occur because the pulse signal applied to the VCM actuator 82 for cancellation of poles has a strong amplitude and stimulates a high-frequency vibration mode of the VCM actuator 82. In particular, the vibration may be serious in a region where data density is high or servo marks are densely recorded, e.g., in an outermost region of a disk because the amplitude of the pulse signal is high in such a region.

The acceleration coefficient of the VCM actuator 82 varies with the hard disk drives, or with the positions of the VCM actuator 82, a direction of the VCM current, or an ambinient temperature even in the same kind of disk drives. Prior art does not consider such variations, and thus the accuracy of servo control is degraded.

The present invention proposes a settling servo control method and apparatus, which distinctively improve settling performance by accurately canceling out slow poles. To effectively cancel out the slow poles, the present invention considers real factors, e.g., dynamic characteristics of a power amplifier and the effect of a delay in a control signal, in a designing process of a controller.

The present invention also proposes a method of controlling the amplitude of a pulse signal applied to a VCM actuator to prevent the VCM actuator from vibrating when the amplitude of the pulse signal is high.

Besides, the present invention proposes an adaptive control method where variation in an acceleration coefficient is accurately estimated and compensated for, to improve the durability of a controller against the variation in the acceleration coefficient of the VCM actuator.

A settling servo control method according to the present invention is characterized in that the amplitude of the pulse signal is determined with reference to the initial position information of a head, the initial velocity information of the head, the initial VCM current information, the initial external disturbance information, and previous control input information, so that slow poles are effectively cancelled out at the beginning of the settling control mode.

In addition, the settling servo control method according to the present invention is characterized in that pulse signals are continuously applied to the VCM actuator during a plurality of sampling periods of a position error signal (PES) at the beginning of the settling control mode, so that it is possible to prevent the VCM actuator from mechanically vibrating. Here, the sampling periods of the PES denote periods during which the PES is sampled. The pulse signals may be continuously applied to the VCM actuator during two sampling periods of the PES. In addition, the amplitude of a first pulse signal applied to the VCM actuator during a first sampling period of the PES, is preferably equal to, but may be different from, the amplitude of a second pulse signal applied to the VCM actuator during a second sampling period of the PES.

Figure 9:
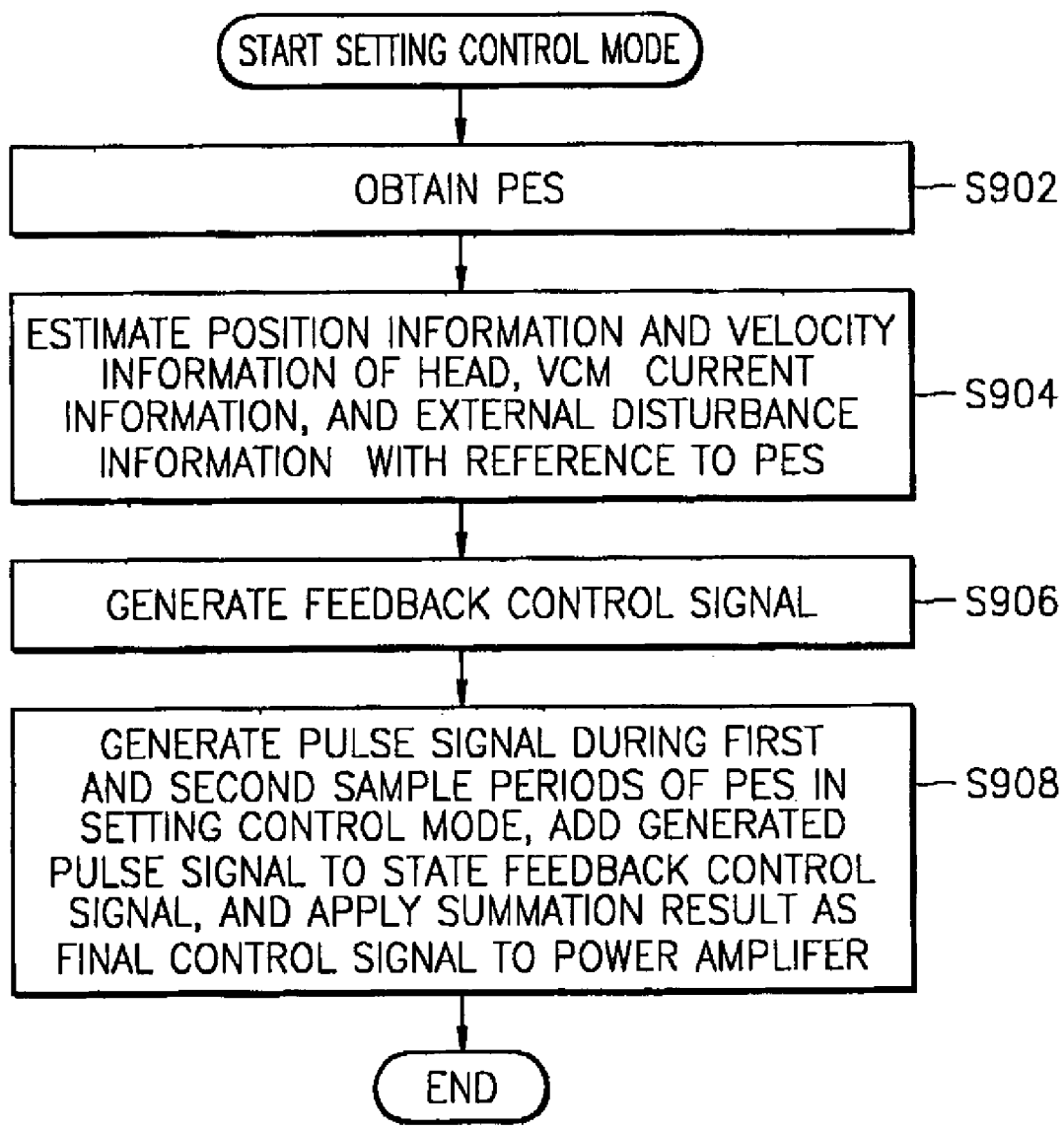
FIG. 9 is a flowchart of a settling servo control method according to the present invention.

FIG. 9 is a flowchart of a settling servo control method according to the present invention, where the pulse signals are continuously applied to the VCM actuator during two sampling periods of the PES from the beginning of the settling control mode, and the amplitudes of the pulse signals are similar to each other.

If the settling control mode starts, the PES indicating a position of a head is obtained in operation S902.

The position of the head, a velocity of the head, a VCM current, and an external disturbance are determined with reference to the PES in operation S904.

Position information of the head and the velocity information of the head are multiplied respectively by predetermined control gains, and thus the multiplication results are determined as the feedback control inputs in operation S906.

In operation S908, pulse signals are generated during the first and the second sampling periods of the PES of the settling control mode. The generated pulse signals are added to the feedback control inputs and external disturbance information, and the summation result is applied to a power amplifier which drives a VCM actuator in operation S908.

More specifically, during the first sampling period of the PES of the settling control mode, the amplitude of a first pulse signal is determined by multiplying the position information of the head, the velocity information of the head, the VCM current information, and the external disturbance information, which are outputted from a state estimator, respectively by predetermined gain constants. The determined amplitude of the pulse signal is stored in a memory.

The first pulse signal having the determined amplitude is added to the feedback control inputs and the external disturbance. The summation result is outputted as a final control signal. This final control signal is applied to the power amplifier which drives the VCM actuator.

During the second sampling period of the PES of the setting control mode, a second pulse signal is generated with reference to the amplitude of the first pulse signal stored in the memory (the amplitude of the first pulse signal determined during the first ample period of the PES) and is added to the feedback control inputs and the external disturbance. The summation result is outputted as another final control signal. This final control signal is applied to the power amplifier. During other sampling period of the PES of the setting control mode, the summation result of the feedback control inputs and the external disturbance without any pulse signal is outputted as a final control signal, and this final control signal is applied to the power amplifier.

The amplitudes of the pulse signals applied to the VCM actuator during first and second sampling periods of the PES of the settling control mode will be described in detail with reference to a settling servo control apparatus according to the present invention of FIG. 10.

Figure 10:
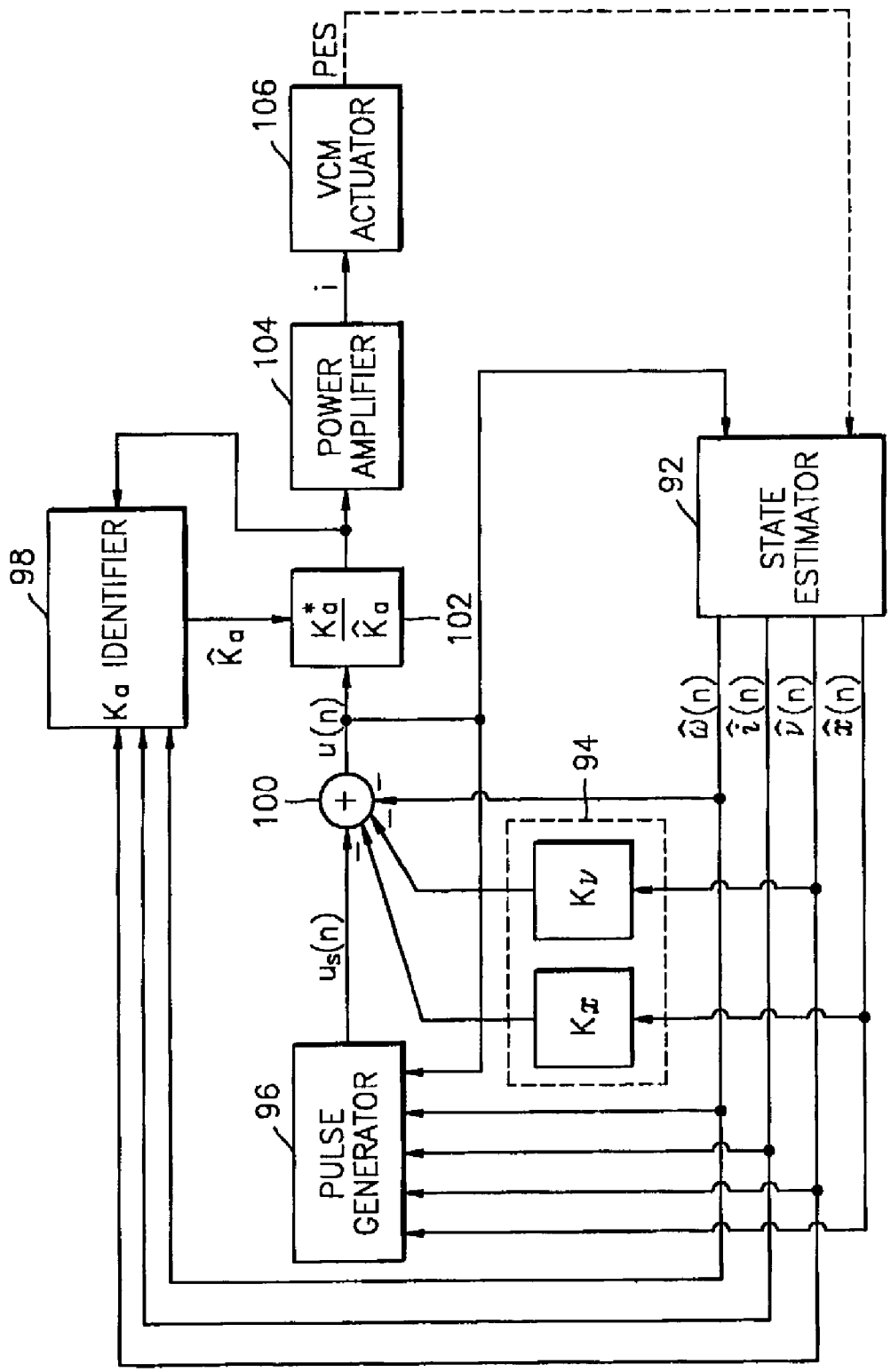
FIG. 10 is a block diagram of a settling servo control apparatus according to an embodiment of the present invention.

FIG. 10 is a block diagram of the settling servo control apparatus according to the present invention. The settling servo control apparatus of FIG. 10 includes a state estimator 92, a feedback gain multiplier 94, a pulse generator 96, an acceleration coefficient identifier 98, an adder 100, and an acceleration coefficient variation compensator 102.

The state estimator 92 estimates position information of a head, velocity information of the head, VCM current information, external disturbance information from the PES, and previous control input information. The feedback gain multiplier 94 multiplies the position information of the head and the velocity information of the head respectively by feedback control gains and generates feedback control inputs. The state estimator 92 receives the PES generated, generally, every time the head passes over servo marks recorded on a disk, estimates and outputs the position information of the head, the velocity information of the head, the VCM current information, and the external disturbance information.

The pulse generator 96 generates pulse signals during the two sampling periods of the PES by using the position information of the head, the velocity information of the head, the VCM current information, the external disturbance information, and the previous control input information at the beginning of the settling control mode. Here, a sampling period Ts is a period during which the state estimator 92 outputs estimated information and is a time necessary for the head to reach a servo mark from another servo mark.

Figure 11:
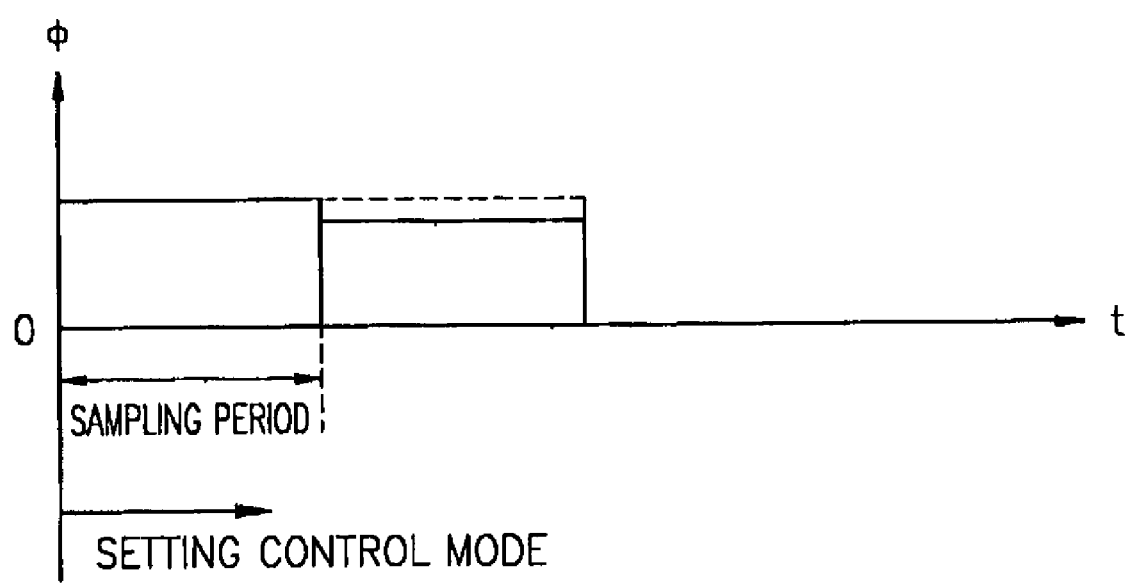
FIG. 11 is a graph showing pulse signals generated from a pulse generator 96 of FIG. 10.

FIG. 11 is a graph of the pulse signals generated from the pulse generator 96 of FIG. 10. As shown in FIG. 11, the pulse generator 96 generates the pulse signals during two sampling periods of the PES from when the settling control mode starts. Each pulse signal lasts during one sampling period of the PES, and the amplitude of each pulse signal, is preferably equal to, but may be different from one another.

The acceleration coefficient identifier 98 accurately identifies an acceleration coefficient without taking into account any variations in the acceleration coefficient due to the manufacturing environments of the disk drives. The acceleration coefficient variation compensator 102 compensates for variation in the acceleration coefficient by multiplying a final control input u(n) by a reciprocal of the variation. Functions of the acceleration coefficient identifier 98 and the acceleration coefficient variation compensator 102 are described below in detail with reference to FIGS. 13 through 15.

In a seek mode, a head moves near a target track by an acceleration/deceleration servo control apparatus and is led to a center of the target track by the settling servo control apparatus of FIG. 10.

The final control input u(n) of the settling servo control apparatus of FIG. 10 is obtained by summing feedback control inputs, external disturbance information and a pulse signal $u_s(n)$ as follows.

$$u(n)=-k_\chi \hat{\chi}(n)-k_v \hat{v}(n)-\hat{\omega}(n)+u_s(n) \quad (2)$$

The feedback control inputs are generated by the feedback gain multiplier 94. The pulse signal $u_s(n)$ is generated by the pulse generator 96. The pulse signal $u_s(n)$ lasts during two sampling periods of a position error signal (PES) from the beginning of a settling control mode as indicated in equation 3 and is added to the feedback control inputs and the external disturbance information to remove the overshoot or the undershoot relative to the center of the target track and to obtain rapid and accurate settling performance.

$$u_s(n)=\Phi\delta(n)+\Phi\delta(n-1) \quad (3)$$

$\delta(n)$ denotes a pulse signal which has a unit value at the beginning of the settling control mode. Equation 3 implies that two pulse signals having the same amplitude of $\Phi$ are consecutively generated during a first sampling period of the PES (time n=0) during which the settling control mode starts and a second sampling period of the PES (time n=1), that is, during the two sampling periods of the PES.

However, the amplitudes of the pulse signals may be different from each other during the first sampling period of the PES (time n=0) and during the second sampling period of the PES (time n=1). In this case, it should be noted that mechanical vibration and resonance might occur because the amplitudes of the pulse signals are higher, compared with the case where the pulse signals having the same amplitudes are generated.

$\Phi$ denotes the amplitude of a pulse signal and is determined with reference to the position information of the head, the velocity information of the head, the VCM current information, the external disturbance information, and the previous control input information, which are estimated at the beginning of the settling control mode. $\Phi$ is calculated by using equation 4 as follows.

$$\Phi=k_{s\chi}\hat{\chi}(0)+k_{sv}\hat{v}(0)+k_{si}\hat{i}(0)+k_{s\omega}\hat{\omega}(0)+k_{su}\hat{u}(-1) \quad (4)$$

According to equation 4, five variables (initial position information $\hat{\chi}(0)$, initial velocity information $\hat{v}(0)$, initial VCM current information $\hat{i}(0)$, initial external disturbance information $\hat{\omega}(0)$, and previous control input information $\hat{u}(-1)$) are used to determine the amplitude of the pulse signal $\Phi$. However, it is possible to use only three variables, the initial position value $\hat{\chi}(0)$, the initial velocity value $\hat{v}(0)$, the initial VCM current value $\hat{i}(0)$ because the predetermined gain constants $k_{s\omega}$ and $k_{su}$ are relatively smaller than the other three gain constants $k_{s\chi}$, $k_{sv}$, and $k_{si}$.

The five gain constants used in equation 4 are described in detail below. The final control input u(n) of the settling servo control apparatus of FIG. 10 obtained by equation 2 is inputted to the power amplifier 104 through the acceleration coefficient variation compensator 102. The power amplifier 104 provides the VCM actuator 106 with a VCM current "i" in response to the multiplication result.

In equation 4, $\hat{u}(-1)$ denotes a previous control input at the time immediately before the settling control mode starts.

The state estimator 92 estimates the position information of a head, the velocity information of the head, the VCM current information, and the external disturbance information. The state estimator 92 is designed as follows.

Firstly, the VCM actuator 106 is designed with reference to the dynamic characteristics of the power amplifier 104, the effect of delays in control signals, and the external disturbance as follows, $$X(n+1)=A_d X(n)+B_d u(n) \quad (5)$$

where X(n) denotes a state variable vector, which is comprised of a variable for the position of the head x(n), a variable for the velocity of the head v(n), a variable for the VCM current i(n), a variable for the external disturbance $\omega(n)$, and a variable for the previous control input u(n−1), and is expressed as follows.

$$X(n)=[\chi(n)\,v(n)\,i(n)\,\omega(n)\,u(n-1)]^T \quad (6)$$

Matrixes $A_d$ and $B_d$ are defined as follows, $$A_d = \begin{bmatrix} 1 & T & K_a\tau[T-\tau+\tau e^{-T/\tau}] & K_a T^2/2 & K_a[(2T-T_d)T_d/2-\tau T_d-\tau^2(e^{-T/\tau}-e^{-(T-T_d)/\tau})] \\ 0 & 1 & K_a\tau[1-e^{-T/\tau}] & K_a T & K_a[T_d+\tau(e^{-T/\tau}-e^{-(T-T_d)/\tau})] \\ 0 & 0 & e^{-T/\tau} & 0 & -e^{-T/\tau}-e^{-(T-T_d)/\tau} \\ 0 & 0 & 0 & 1 & 0 \\ 0 & 0 & 0 & 0 & 0 \end{bmatrix} \quad (7)$$

$$B_d = \begin{bmatrix} K_a[(T-T_d)^2/2-\tau(T-T_d)-\tau^2(1-e^{-(T-T_d)/\tau})] \\ K_a[T-T_d+\tau(e^{-(T-T_d)/\tau}-1)] \\ (1-e^{-(T-T_d)/\tau}) \\ 0 \\ 1 \end{bmatrix}$$

where constants $K_a$, $\tau$, T, and $T_d$ each denote an acceleration coefficient, a time constant of a power amplifier, a sampling time, a time delay in a control signal. The state estimator 92 uses equations 8 based on equations 5 through 7.

$$\hat{\chi}(n)=\overline{X}(n)+L_e[PES(n)-\overline{x}(n)]$$

$$\overline{X}(n+1)=A_d\overline{X}(n)+B_d u(n) \quad (8)$$

where $L_e$ denotes a gain of an estimated value, PES(n) denotes a current position of the head, $\overline{\chi}(n)$ denotes a predicted position of the head, $[PES(n)-\overline{\chi}(n)]$ denotes a prediction error, $\hat{\chi}(n)$ denotes the estimated value; and $\overline{X}(n)$ denotes a predicted value. The predicted value is a value of a next state predicted in a current state.

Hereinafter, a method of determining the amplitude of the pulse signal $\Phi$ in equation 4 will be described. When a settling servo control apparatus is used based on equations 2 through 4, a response of a controller is as follows, $$X(n+1)=(A_d-B_d K_s)X(n)+B_d[\Phi\delta(n)+\Phi\delta(n-1)] \quad (9)$$

where vector $K_S$ is comprised of feedback gains as follows, $$K_S=[K_\chi K_v 010] \quad (10)$$

A response to the position of the head may be obtained by z-conversion of equation 10 as follows.

$$\chi(z) = C_d(zI - A_d + B_d K_s)^{-1}[zX(0) + B_d\Phi(1+z^{-1})] \quad (11)$$

A first term of the right side of equation 11 denotes the response to the position of the head by using an initial state variable vector X(0). A second term of the right side of equation 11 denotes the response to the position of the head by using the pulse signal.

As implied in equation 11, zeros are determined based on the initial state variable vector X(0) and the amplitude of the pulse signal $\Phi$.

Next, a method of determining the amplitude of the pulse signal $\Phi$, which is used to improve response performance of the settling servo control apparatus, is described. In a case where a position of slow poles to be cancelled out is z*, equation 11 is transformed into equation 12.

$$C_d(z^*I - A_d + B_d K_S)^{-1}[z^*X(0) + B_d\Phi(1+z^{*-1})] = 0 \quad (12)$$

Therefore, the amplitude of the pulse signal $\Phi$ is determined to cancel out slow poles as follows.

$$\Phi = \frac{C_d(z^*I - A_d + B_d K_s)^{-1}z^*}{C_d(z^*I - A_d + B_d K_s)^{-1}B_d(1+z^{*-1})} X(0) \quad (13)$$
$$= K_{sx}\hat{x}(0) + k_{sv}\hat{v}(0) + k_{si}\hat{i}(0) + k_{s\omega}\hat{\omega}(0) + k_{su}\hat{u}(-1)$$

The prior art also discloses cancellation of slow poles by using the pulse signal to improve settling performance of a settling servo similarly to the present invention. However, when the amplitude of the pulse signal is determined, the prior art does not consider real factors such as response characteristics of a power amplifier and the effect of a delay in a control signal, and an external disturbance. Thus, the accuracy of cancellation of poles is degraded. In addition, since a single pulse is used in the prior art, a sampling time is gradually decreased. Thus, the amplitude of the pulse signal that is required for cancellation of slow poles increases, which causes vibration of the VCM actuator.

In the present invention, two pulse signals are consecutively generated during two sampling periods of the PES rather than during one sampling period to reduce the amplitude of the pulse signal, as implied in equation 3. Thus, although the sampling time of the PES is decreased, it is possible to prevent the VCM actuator from vibrating.

Meanwhile, it is also possible to effectively control the amplitude of the pulse signal with reference to initial VCM current information, external disturbance information, and previous control input information.

Figure 12:
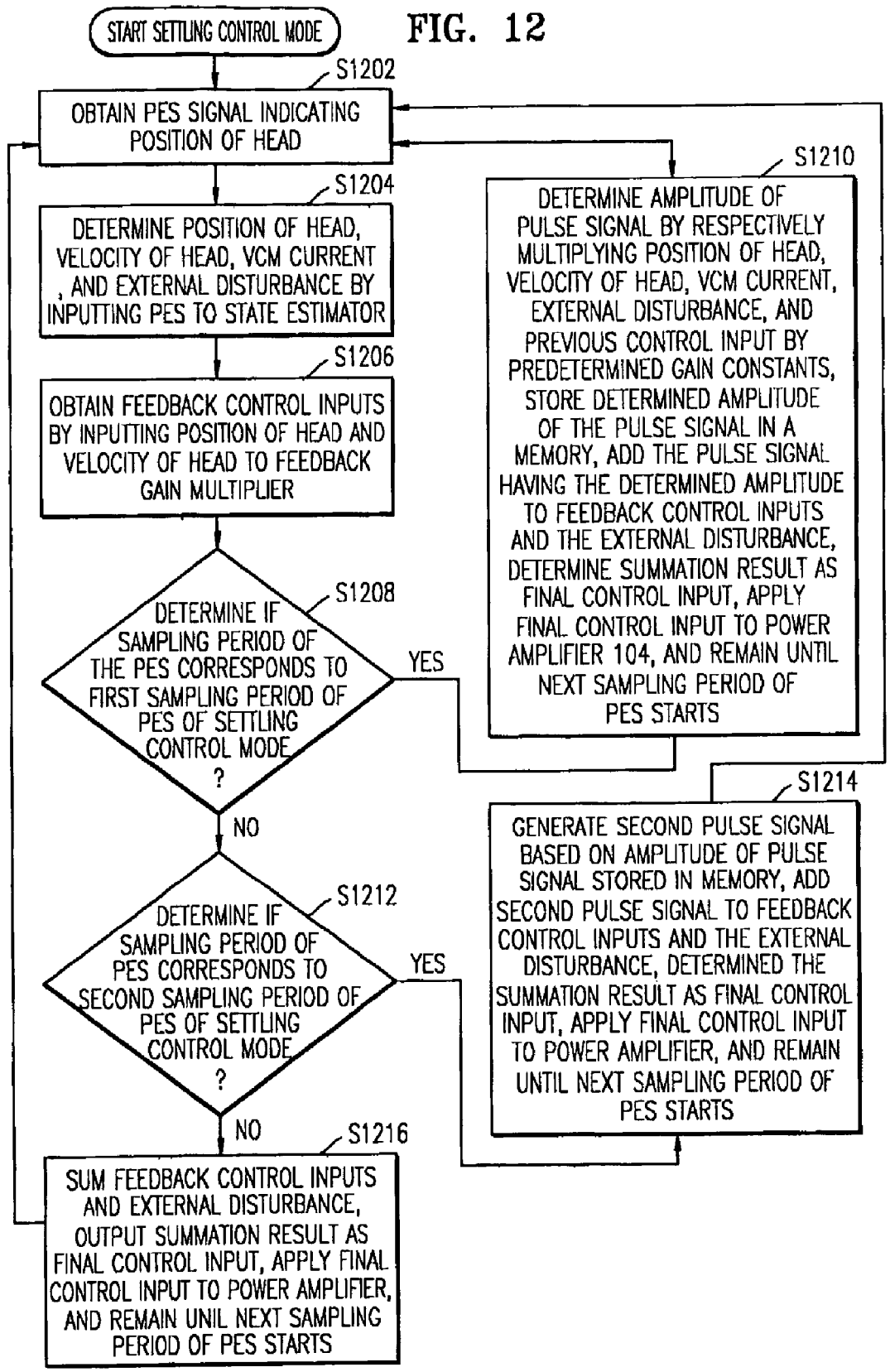
FIG. 12 is a flowchart for performing settling servo control by using the settling servo control apparatus of FIG. 10.

FIG. 12 is a flowchart of performing settling servo control by using the settling servo control apparatus of FIG. 10, where two pulse signals are consecutively generated during two sampling periods of a position error signal(PES) from the beginning of the settling control mode, and their amplitudes are equal to each other.

When the settling control mode starts, the PES indicating a current position of a head is obtained in operation S1202.

A position of a head, a velocity of the head, a VCM current, and an external disturbance are determined by inputting the PES to the state estimator 92 in operation S1204. The state estimator 92 estimates the position information of the head, the velocity information of the head, the VCM current information, and the external disturbance information with reference to the PES and previous control input information according to a design of a VCM actuator using equations 5 through 8. The position information of the head and the velocity information of the head estimated by the state estimator 92 are inputted to the feedback gain multiplier 94, and feedback control inputs are obtained in operation S1206. That is, the feedback gain multiplier 94 multiplies the position information of the head and the velocity information of the head determined in operation S1204 respectively feedback control gains, and the multiplication results are outputted as feedback control inputs.

It is determined if a sampling period of a position error signal (PES) corresponds to a first sampling period of the PES of a settling control mode in operation S1208. If so, the amplitude of a first pulse signal is determined by multiplying the position information of the head, the velocity information of the head, the VCM current information, the external disturbance information, and the previous control input information respectively by predetermined gain constants, and the determined amplitude of the first pulse signal is stored in a memory (not shown). The first pulse signal having the determined amplitude is added to the feedback control inputs and the external disturbance, and thus the summation result is determined as a final control input. The final control input is applied to the power amplifier 104 which drives the VCM actuator 106. The process is held until a next sampling period of the PES starts and moves to operation S1202 if the next sampling period of the PES starts in operation S1210.

If the sampling period of the PES does not correspond to the first sampling period of the PES of the settling control mode in operation S1208, it is determined if the sampling period of the PES corresponds to a second sampling period of the PES of the settling control mode in operation S1212.

If so, a second pulse signal is generated based on the amplitude of the first pulse signal stored in the memory (not shown) in operation S1210 (that is, the amplitude of the first pulse signal determined during the first sampling period of the PES), and the second pulse signal is added to the feedback control inputs obtained in operation S1206 and the external disturbance. Thus, the summation result is determined as a final control input, and this final control input is applied to the power amplifier 104. The process is held until a next sampling period of the PES starts and moves to operation S1202 if the next sampling period of the PES starts in operation S1214.

If the sampling period of the PES does not correspond to the second sampling period of the PES of the settling mode in operation S1212, the feedback control inputs and the external disturbance are summed, and the summation result is outputted as a final control input. This final control input is applied to the power amplifier 104, and the process is held until a next sampling period of the PES starts and moves to operation S1202 if the next sampling period of the PES starts in operation S1216.

As shown in equation 13, the amplitude of a pulse signal used to cancel out slow poles depends on variables of the settling servo control apparatus of FIG. 10.

Actually, an acceleration coefficient of a VCM actuator varies with the disk drives due to the manufacturing environments of the disk drives. Even in the same kind of disk drives, the acceleration coefficient of the VCM actuator varies with a position of the VCM actuator, a direction of the VCM current, or an ambinient temperature. Therefore, the settling control servo apparatus needs a method of compensating for variation in the acceleration coefficient so as to accurately cancel out slow poles. However, the prior art has not yet considered variation in the acceleration coefficient in a designing process of a controller.

The present invention proposes a method of effectively estimating and compensating for the acceleration coefficient based on the position information of the head, the velocity information of the head, and the VCM current information.

Figure 13:
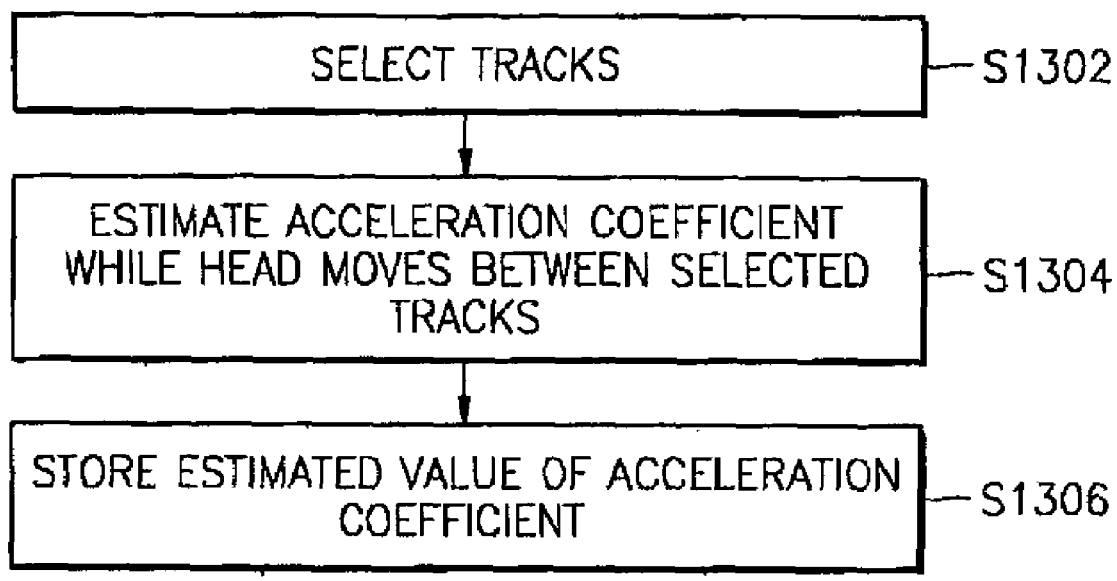
FIG. 13 is a flowchart of a method of estimating an acceleration coefficient according to an embodiment of the present invention.

FIG. 13 is a flowchart of a method of estimating the acceleration coefficient according to an embodiment of the present invention.

Firstly, a plurality of tracks are selected in operation S1302, which are separated by a predetermined interval on a disk.

The acceleration coefficient is estimated while a head moves between the selected tracks, that is, the head moves a predetermined distance with the VCM current applied to the VCM actuator 106 in operation S1304.

The acceleration coefficient identifier 98 estimates the acceleration coefficient of the VCM actuator 106 by using the previous control input information, the position information of the head, the velocity information of the head, the VCM current information, and the external disturbance information as follows, $$\hat{K}_a = \frac{\sum_{n=1}^{N}[\hat{v}(n+1)-\hat{v}(n)][b_1\hat{i}(n)+b_2\hat{\omega}(n)+b_3u(n)+b_4u(n-1)]}{\sum_{n=1}^{N}[b_1\hat{i}(n)+b_2\hat{\omega}(n)+b_3u(n)+b_4u(n-1)]} \quad (14)$$

where coefficients $b_1$, $b_2$, $b_3$, and $b_4$ are defined as follows.

$b_1 = \tau(1-e^{-T/\tau})$ $b_2 = T$ $b_3 = T - T_d + \tau(e^{-T/\tau}-1)$ $b_4 = T_d + \tau(e^{-T/\tau} - e^{-(T-T_d)/\tau})$ \quad (15)

The acceleration coefficients are identified during a setting process performed every time when a power of a disk drive is turned on.

Since the acceleration coefficients vary with the position of the VCM actuator 106, the coefficients are estimated in the selected tracks. Acceleration constants estimated in other tracks are approximated by using linear interpolation.

Since the acceleration coefficients also vary with respect to the direction of the VCM current, the acceleration coefficients are estimated in connection with both directions of the VCM current. After completion of the estimation of the acceleration coefficients, estimated values of the acceleration coefficients are adaptively applied to the acceleration coefficient variation compensator 102 to compensate for a variation in the acceleration coefficient.

The estimated values of the acceleration coefficient in selected tracks $x_{Ta}$, $x_{Tb}$, $x_{Tc}$, and $x_{Td}$ are stored in operation S1306. The estimated values of the acceleration coefficients in other tracks are obtained by using linear interpolation without being actually measured.

Figure 14A:
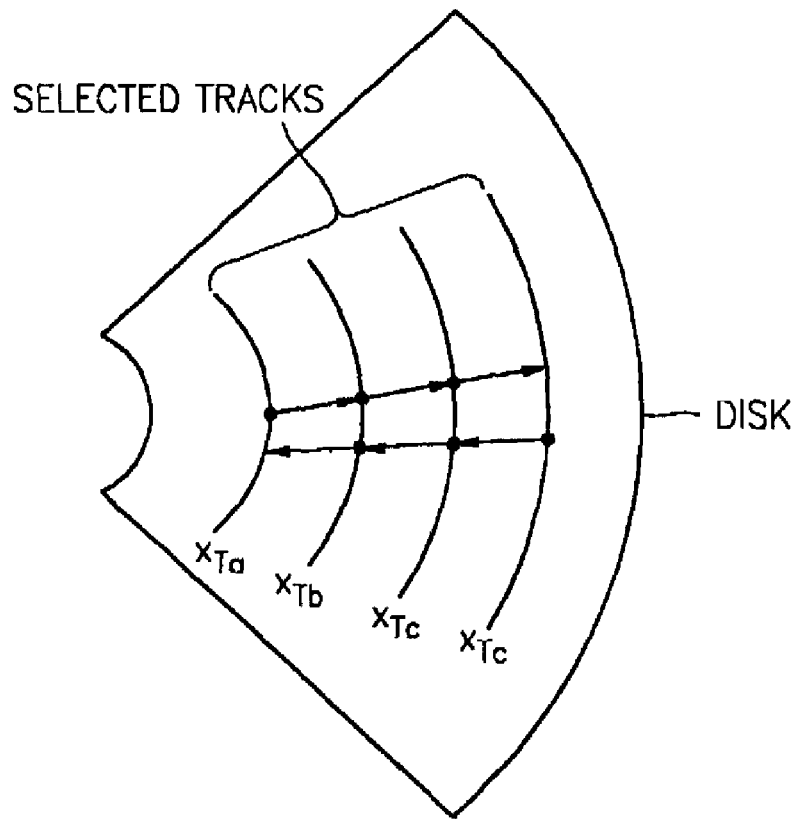
FIGS. 14A and 14B are schematic views for showing the method of estimating the acceleration coefficient of FIG. 13.
Figure 14B:
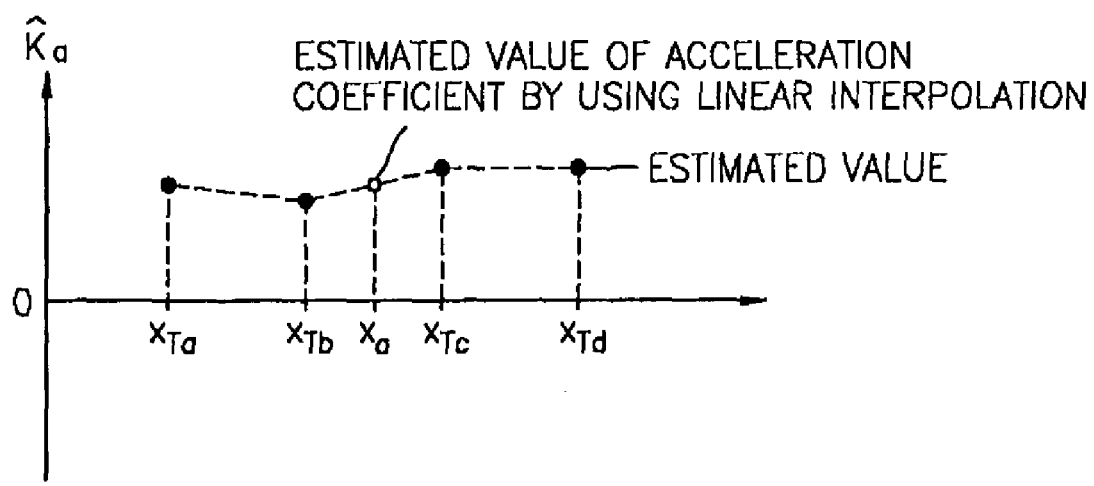

FIGS. 14A and 14B are schematic views for showing the method of estimating the acceleration coefficients of FIG. 13.

Four tracks $x_{Ta}$, $x_{Tb}$, $x_{Tc}$, and $x_{Td}$ on the disk are selected to estimate the acceleration coefficients. The selected tracks are separated by a predetermined interval.

As a result of operation S1304, a graph showing the estimated values of the acceleration coefficients in the selected tracks $x_{Ta}$, $x_{Tb}$, $x_{Tc}$, and $x_{Td}$ is obtained. As shown in FIG. 14B, an estimated value of an acceleration coefficient in a track $x_a$ is obtained by using linear interpolation based on the estimated values of the acceleration coefficients in the selected tracks $x_{Tb}$ and $x_{Tc}$.

The acceleration coefficient identifier 98 of FIG. 10 outputs an estimated value of an acceleration coefficient in a current position $\hat{K}_a$ with reference to the velocity information of the head $\hat{v}(n)$ provided by the state estimator 92.

The final control input u(n) of FIG. 10 is multiplied by a ratio of $\hat{K}_a$, i.e., the estimated value of the acceleration coefficient (?), to $K^*_a$, i.e., a representative acceleration coefficient, and the multiplication result is applied to the power amplifier 104 which drives the VCM actuator 106.

Figure 15:
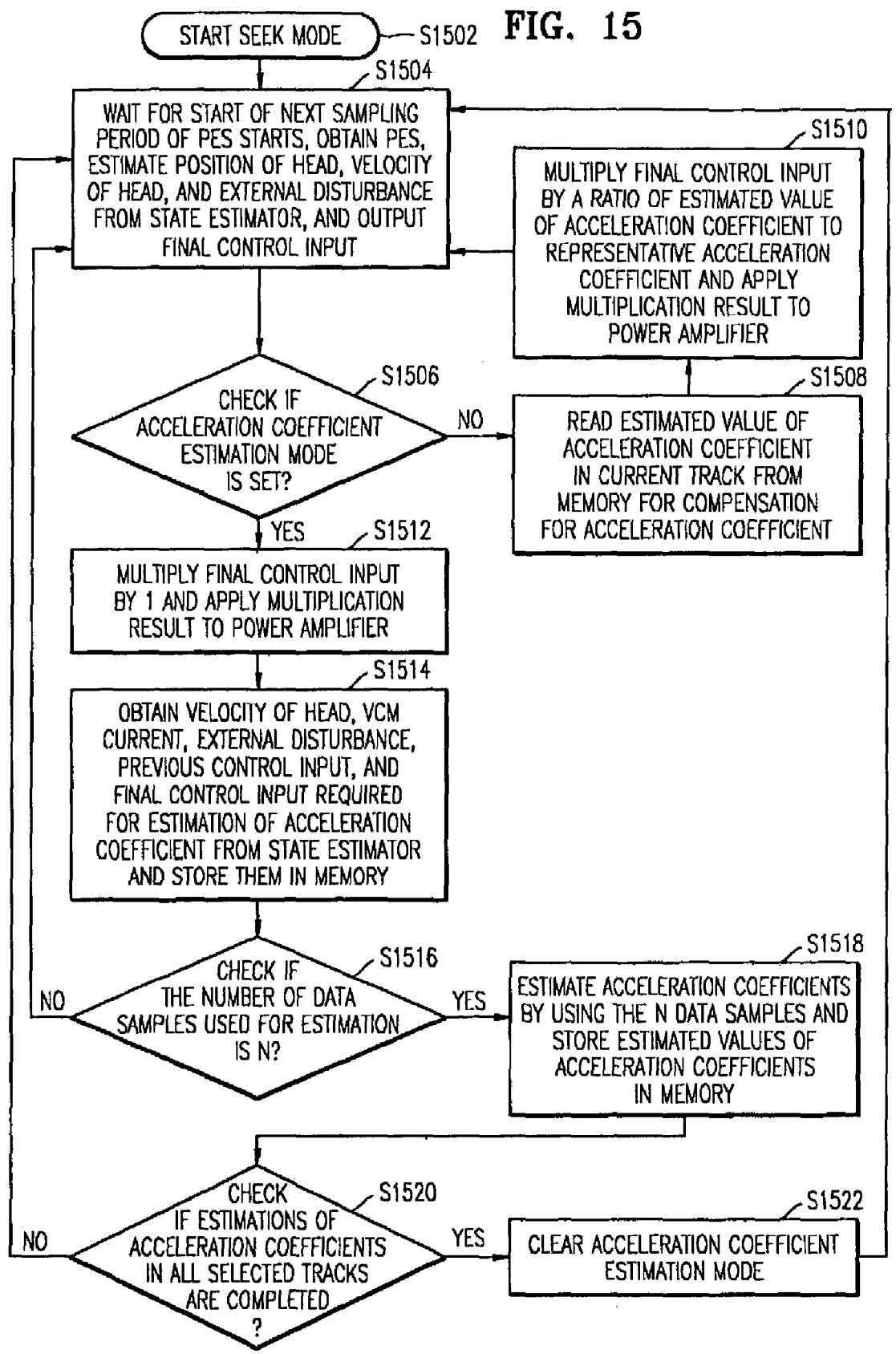
FIG. 15 is a flowchart of a control method of hard disk drives to estimate and compensate for the acceleration coefficient according to an embodiment of the present invention.

FIG. 15 is a flowchart of a method of controlling hard disk drives to estimate and compensate for the acceleration coefficient according to an embodiment of the present invention.

First, a seek mode starts in operation S1502. More specifically, the head moves between the selected tracks with the VCM current applied to the VCM actuator 106. The process is held until a next sampling period of the PES starts. If the next sampling period of the PES starts, the position information of the head, the velocity information of the head, and the external disturbance information are estimated by the state estimator 92 based on the PES, and a final control input is obtained by using the position information of the head and the velocity information of the head processed by the feedback gain multiplier 94 and the external disturbance in operation S1504.

An acceleration coefficient estimation mode is checked to determine whether it is set (operation S1506).

If so, the final control input is multiplied by 1, and the multiplication result is applied to the power amplifier 104 (operation S1512). That is, the acceleration coefficient is not compensated for.

The velocity information of the head, the VCM current information, the external disturbance information, the previous control input information, and the final control input, which are required for estimation of the acceleration coefficient, are obtained from the state estimator 92 and are stored in a memory (not shown) (operation S1514).

The number of data samples used for estimation may be N (operation S1516).

If so, acceleration coefficients are estimated by using N data samples, and estimated values of the acceleration coefficients are stored in the memory (operation S1518). Then, the process goes to operation S1520.

If the acceleration coefficient estimation mode is not set in operation S1506, the process goes to operation S1508.

Estimations of the acceleration coefficients in all selected tracks may be completed (operation S1520).

If so, the acceleration coefficient estimation mode is cleared (operation S1522). Then, the process goes back to operation S1504.

If the estimations of the acceleration coefficients in all selected tracks are not completed as a result of operation S1520, the process goes back to operation S1504.

The estimated value of the acceleration coefficient in a current track is read from the memory for compensation for the acceleration coefficient (operation S1508).

A final control input is multiplied by a ratio of the estimated value of the acceleration coefficient to a representative acceleration coefficient, and the multiplication result is applied to a power amplifier (operation S1510). Then, the process goes to operation S1504.

Although the method of estimating and compensating for the acceleration coefficient according to the present invention is described for use with a settling servo, it will be fully and easily understood by those skilled in the art that the method of estimating and compensating for the acceleration coefficient described here is also useful to control a conventional servo.

Figure 16:
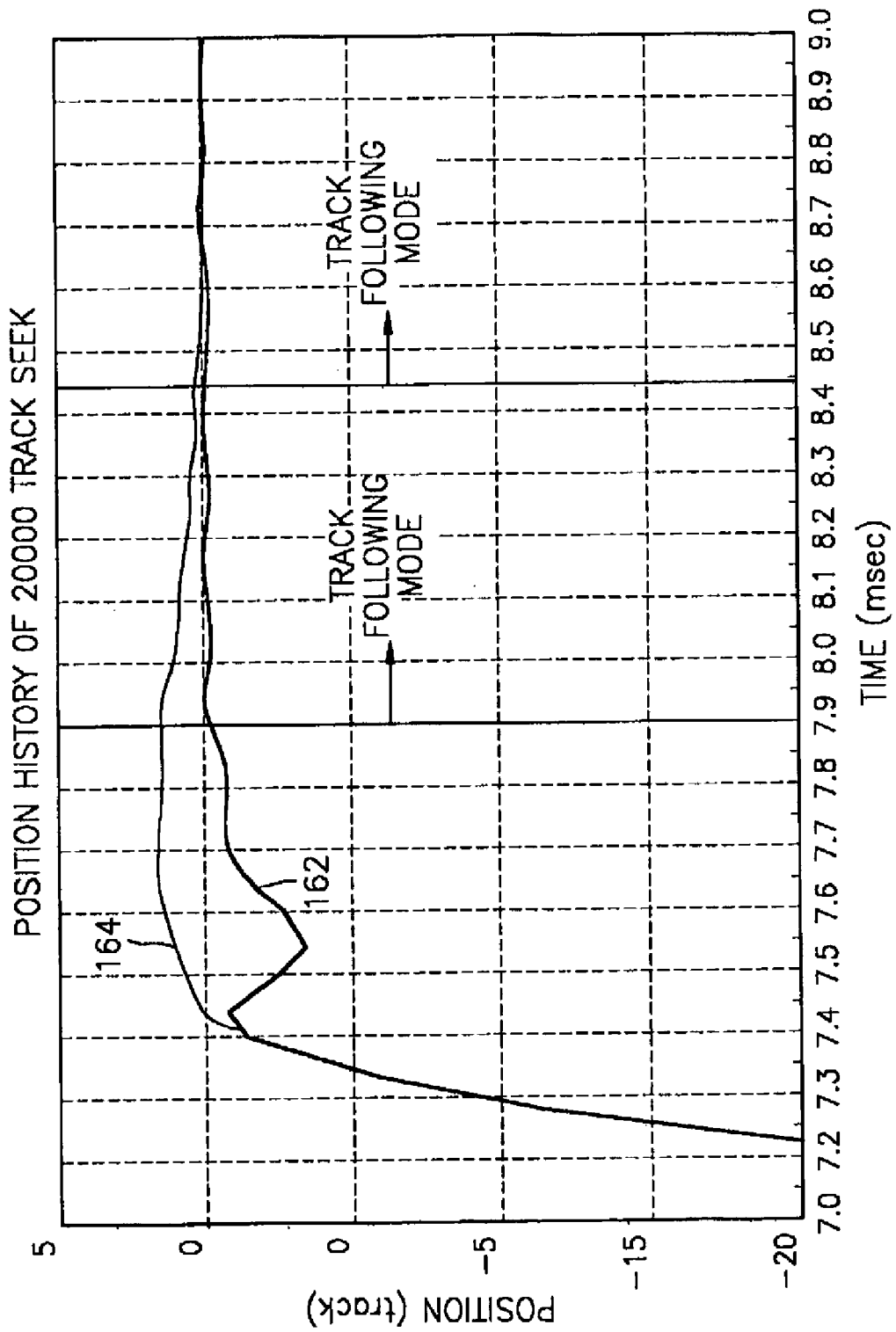
FIG. 16 is a graph showing a response to a position of the head in the settling servo control apparatus according to an embodiment of the present invention.

According to the settling servo control apparatus of the present invention, it is possible to prevent overshoot or undershoot from occurring in a center of a target track by canceling out slow poles using addition of zeros. Thus, a track seeking time can be reduced, and operation reliability of disk drives can be improved. FIG. 16 shows an improvement of settling performance according to an embodiment of the present invention.

FIG. 16 is a graph showing a response of a settling servo to a position of a head in the settling servo control apparatus according to an embodiment of the present invention. Here, results shown in FIG. 16 are obtained by measuring the response of the settling servo during a seek mode where the head moves over 200,000 tracks. A graph 162 drawn in a bold line shows a response to the position of the head in the settling servo control apparatus of the present invention. A graph 164 drawn in a thin line shows a response to the position of the head in a conventional settling servo controller which has no pole-cancellation.

As shown in FIG. 16, it is possible to decrease the track seeking time by 0.55 msec by using the settling servo control apparatus of the present invention, which prevents occurrence of overshoot.

In the prior art, although the settling performance is improved, the cancellation of slow poles indicates a slow response to the position of the head. Also, the prior art does not consider real factors such as dynamic characteristics of a power amplifier, the effect of a delay in a control signal, an external disturbance, and variation in an acceleration coefficient of a VCM actuator in a designing process of the settling servo control apparatus. Thus, the accuracy of cancellation of poles is degraded. Moreover, since a single pulse is used in the prior art, the sampling time is gradually decreased. Thus, the amplitude of the pulse signal that is required for cancellation of the poles increases, which results in vibration of the VCM actuator.

Figure 17:
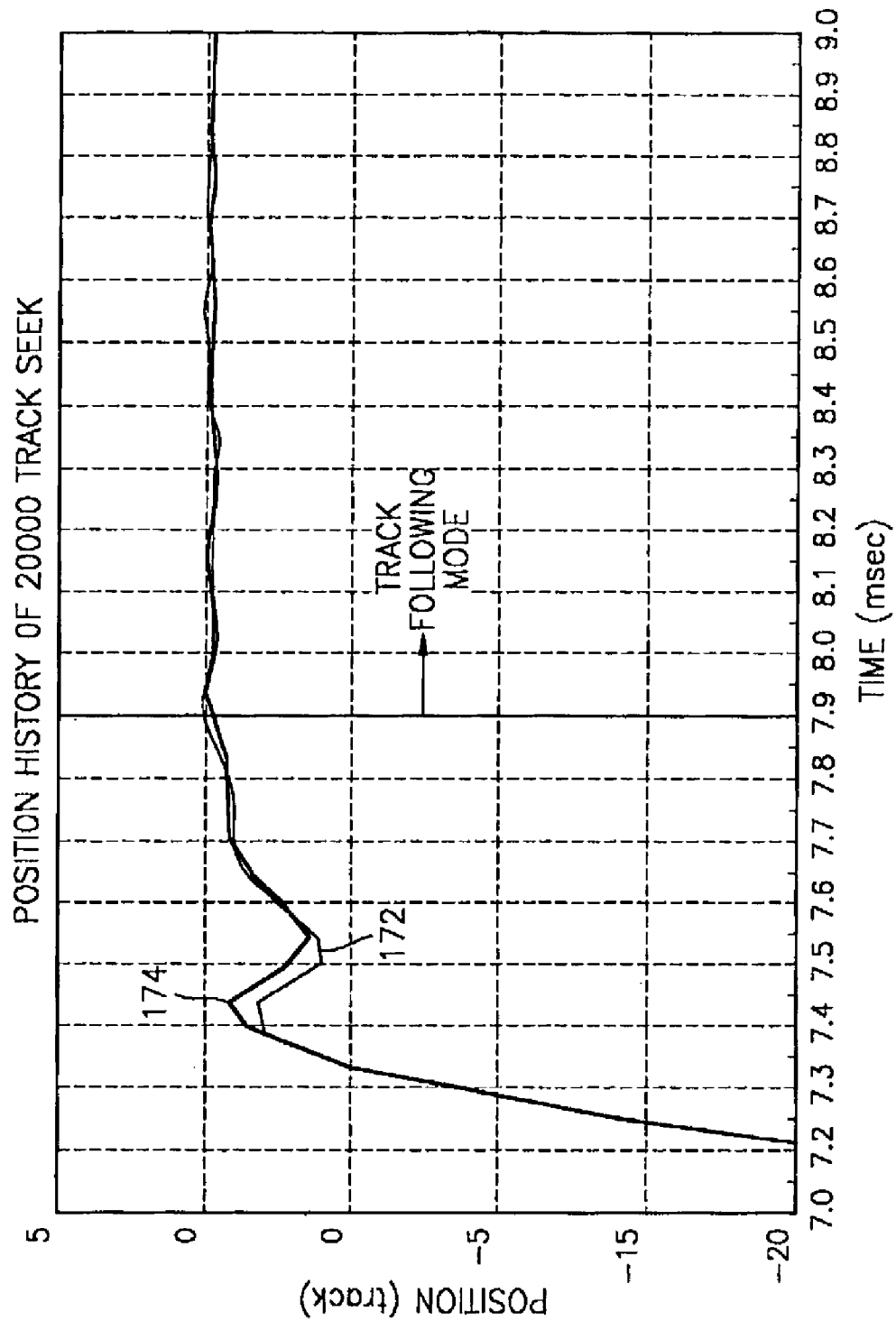
FIG. 17 is another graph showing the position of the head in the settling servo control apparatus according to an embodiment of the present invention.

However, the present invention prevents the VCM actuator from vibrating and reduces the amplitude of the pulse signal by consecutively generating two pulse signals each during two sampling periods of a position error signal (PES). FIG. 17 shows performances of a conventional settling servo controller and the settling servo control apparatus according to the present invention for comparison thereof.

FIG. 17 is another graph showing the position of the head in the settling servo control apparatus according to an embodiment of the present invention. The results shown in FIG. 17 are obtained by measuring the response during a seek mode where the head moves over 200,000 tracks. A graph 174 drawn in a bold line expresses a response of a settling servo to the position of the head in the settling servo control apparatus of an embodiment of the present invention. A graph 172 drawn in a thin line expresses a response of the settling servo to the position of the head in a conventional settling servo controller.

As shown in FIG. 17, the performance of the settling servo is more stable in the settling servo control apparatus of the present invention than the conventional settling servo controller.

According to a settling servo control method of the present invention, real factors such as dynamic characteristics of a power amplifier and the effect of a delay in a control signal are considered in a designing process of a controller, and thus it is possible to cancel out slow poles effectively and improve a response of a settling servo.

According to a settling servo control apparatus of the present invention, it is possible to prevent vibration of a VCM actuator caused by a pulse signal having a strong amplitude by controlling the amplitude of the pulse signal applied to the VCM actuator for cancellation of slow poles.

Besides, a method of estimating and compensating for an acceleration coefficient of a disk drive according to the present invention adopts an adaptive control method in which variation in the acceleration coefficient is accurately estimated and compensated for, so that robustness of a controller to the variation in the acceleration coefficient of the VCM actuator is improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A settling servo control method for a hard disk drive in which a pulse signal is applied to a voice coil motor (VCM) actuator to cancel slow poles effectively at a beginning of a settling control mode, comprising:

determining an amplitude of the pulse signal with reference to at least one of initial VCM current information, initial external disturbance information, previous control input information, initial position information of a head, and initial velocity information of the head to cancel slow poles at the beginning of the settling control mode based on at least one of dynamic characteristics of a power amplifier or an effect of a delay in a control signal.

2. The settling servo control method of claim 1, wherein the pulse signal is determined by equation $u_s(n)=\Phi\delta(n)$, where $\delta(n)$ is a pulse signal having a unit value and is determined as follows, $$\Phi = k_{s\chi}\hat{\chi}(0) + k_{sv}\hat{v}(0) + k_{si}\hat{i}(0) + k_{s\omega}\hat{\omega}(0) + k_{su}\hat{u}(-1)$$

where $k_{s\chi}$, $k_{sv}$, $k_{si}$, $k_{s\omega}$, and $k_{su}$ are each used as a constant, respectively, for initial position information $\hat{\chi}(0)$ of the head, initial velocity information $\hat{v}(0)$ of the head, initial VCM current information $\hat{i}(0)$, initial external disturbance information $\hat{\omega}(0)$, and previous control input information $\hat{u}(-1)$.

3. A settling servo control method for a hard disk drive comprising:

applying pulse signals to a voice coil motor (VCM) actuator for effective cancellation of slow poles at a beginning of a settling control mode based on at least one of dynamic characteristics of a power amplifier or an effect of a delay in a control signal, wherein the pulse signals are consecutively applied to the VCM actuator during sampling periods of a position error signal (PES) from the beginning of the settling control mode.

4. The settling servo control method of claim 3, wherein the pulse signals are consecutively applied to the VCM actuator during two sampling periods of the PES from the beginning of the settling control mode.

5. The settling servo control method of claim 4, wherein amplitudes of the pulse signals during first and second sampling periods of the PES are determined based on a first sampling of the PES.

6. The settling servo control method of claim 5, wherein the pulse signals generated from a pulse generator are determined by equation $u_s(n)=\Phi\delta(n)+\Phi\delta(n-1)$, where δ(n) is a pulse signal having a unit value and is determined as follows, $$\Phi = k_{s\chi}\hat{\chi}(0) + k_{sv}\hat{v}(0) + k_{si}\hat{i}(0) + k_{s\omega}\hat{\omega}(0) + k_{su}\hat{u}(-1)$$

where $k_{s\chi}$, $k_{sv}$, $k_{si}$, $k_{s\omega}$, and $k_{su}$ are each used as a constant respectively for initial position information $\hat{\chi}(0)$ of a head, initial velocity information $\hat{v}(0)$ of the head, initial VCM current information $\hat{i}(0)$, initial external disturbance information $\hat{\omega}(0)$, and previous control input information $\hat{u}(-1)$.

7. The settling servo control method of claim 4, wherein an amplitude of a pulse signal applied during a first sampling period of the PES is determined based on a first sampling of the PES, and an amplitude of a pulse signal applied during a second sampling period of the PES is determined based on a second sampling of the PES.

8. The settling servo control method of claim 3, wherein the amplitudes of the pulse signals are determined with reference to at least one of initial VCM current information, initial external disturbance information, previous control input information, initial position information of a head, and initial velocity information of the head.

9. A settling servo control method for a hard disk drive, comprising:
   obtaining a position error signal (PES) indicating a current position of a head if a settling control mode starts;
   estimating position information of the head, velocity information of the head, voice coil motor (VCM) current information, and external disturbance information with reference to the PES;
   respectively multiplying the position information of the head and the velocity information of the head by control gains and outputting the multiplication results and the external disturbance information as feedback control signals;
   generating pulse signals used for cancellation of slow poles at a beginning of the settling control mode, adding the pulse signals to the feedback control signals, and outputting a summation result as a control input, where the pulse signals are consecutively applied during first and second sampling periods of the PES of the settling control mode; and
   driving a VCM actuator by using the control input.

10. The settling servo control method of claim 9, wherein the pulse signals generated from a pulse generator are determined by equation $u_s(n) = \Phi\delta(n)$
   where δ(n) is a pulse signal having a unit value and is determined as follows, $$\Phi = k_{s\chi}\hat{\chi}(0) + k_{sv}\hat{v}(0) + k_{si}\hat{i}(0) + k_{s\omega}\hat{\omega}(0) + k_{su}\hat{u}(-1)$$

where $k_{s\chi}$, $k_{sv}$, $k_{si}$, $k_{s\omega}$, and $k_{su}$ are each used as a constant respectively for initial position information $\hat{\chi}(0)$ of the head, initial velocity information $\hat{v}(0)$ of the head, initial VCM current information $\hat{i}(0)$, initial external disturbance information $\hat{\omega}(0)$, and previous control input information $\hat{u}(-1)$.

11. The settling servo control method of claim 9, wherein the pulse signals generated from a pulse generator are determined by equation $u_s(n) = \Phi\delta(n)\Phi\delta(n-1)$,
   where δ(n) is a pulse signal having a unit value and is determined as follows, $$\Phi = k_{s\chi}\hat{\chi}(0) + k_{sv}\hat{v}(0) + k_{si}\hat{i}(0) + k_{s\omega}\hat{\omega}(0) + k_{su}\hat{u}(-1)$$

where $k_{s\chi}$, $k_{sv}$, $k_{si}$, $k_{s\omega}$, and $k_{su}$ are each used as a constant respectively for initial position information $\hat{\chi}(0)$ of the head, initial velocity information $\hat{v}(0)$ of the head, initial VCM current information $\hat{i}(0)$, initial external disturbance information $\hat{\omega}(0)$, and previous control input information $\hat{u}(-1)$.

12. A settling servo control apparatus comprising:
   a state estimator which estimates position information of a head, velocity information of the head, voice coil motor (VCM) current information, and external disturbance information with reference to a position error signal (PES);
   a feedback gain multiplier which multiplies the position information of the head and the velocity information of the head respectively by predetermined feedback control gains and outputs multiplication results as feedback control inputs;
   a pulse generator which generates pulse signals used for cancellation of slow poles with reference to at least one of initial VCM current information, initial external disturbance information, and previous control input information, initial position information of the head, and initial velocity information of the head; and
   an adder which sums the feedback control inputs, the external disturbance information and the pulse signals generated from the pulse generator and outputs a summation result to a voice coil motor (VCM) actuator as a control input.

13. The settling servo control apparatus of claim 12, wherein the pulse signals generated from a pulse generator are determined by equation $u_s(n) = \Phi\delta(n)$,
   where δ(n) is a pulse signal having a unit value and is determined as follows, $$\Phi = k_{s\chi}\hat{\chi}(0) + k_{sv}\hat{v}(0) + k_{si}\hat{i}(0) + k_{s\omega}\hat{\omega}(0) + k_{su}\hat{u}(-1)$$

where $k_{s\chi}$, $k_{sv}$, $k_{si}$, $k_{s\omega}$, and $k_{su}$ are each used as a constant respectively for initial position information $\hat{\chi}(0)$ of the head, initial velocity information $\hat{v}(0)$ of the head, initial VCM current information $\hat{i}(0)$, initial external disturbance information $\hat{\omega}(0)$, and previous control input information $\hat{u}(-1)$.

14. The settling servo control apparatus of claim 12, wherein the pulse signals generated from a pulse generator are determined by equation $$u_s(n) = \Phi\delta(n) + \Phi\delta(n-1),$$

where δ(n) is a pulse signal having a unit value and is determined as follows, $$\Phi = k_{s\chi}\hat{\chi}(0) + k_{sv}\hat{v}(0) + k_{si}\hat{i}(0) + k_{s\omega}\hat{\omega}(0) + k_{su}\hat{u}(-1)$$

where $k_{s\chi}$, $k_{sv}$, $k_{si}$, $k_{s\omega}$, and $k_{su}$ are each used as a constant respectively for initial position information $\hat{\chi}(0)$ of the head, initial velocity information $\hat{v}(0)$ of the head, initial VCM current information $\hat{i}(0)$, initial external disturbance information $\hat{10\hat{7}}(0)$, and previous control input information $\hat{u}(-1)$.

15. The settling servo control apparatus of claim 12, where the settling servo control apparatus further comprises:
   an acceleration coefficient identifier which estimates acceleration coefficients of the VCM actuator with reference to the velocity information of the head, the VCM current information, and the external disturbance information estimated by the state estimator, and previous control input information; and
   an acceleration coefficient compensator which compensates for variation in the acceleration coefficients by multiplying the control input outputted from the adder by a reciprocal of an estimated value of the acceleration coefficient provided from the acceleration coefficient identifier.

16. The settling servo control apparatus of claim 15, wherein the acceleration coefficients are estimated as follows, $$\hat{K}_a = \frac{\sum_{n=1}^{N}[\hat{v}(n+1)-\hat{v}(n)][b_1\hat{i}(n)+b_2\hat{\omega}(n)+b_3u(n)+b_4u(n-1)]}{\sum_{n=1}^{N}[b_1\hat{i}(n)+b_2\hat{\omega}(n)+b_3u(n)+b_4u(n-1)]}$$

where $\hat{v}(n)$, $\hat{i}(n)$, and $\hat{\omega}(n)$ each denote velocity information of the head, VCM current information, and external disturbance information during a $n^{th}$ sampling period of the PES, and acceleration coefficients $b_1$, $b_2$, $b_3$, and $b_4$ are defined as follows, $b_1 = \tau(1-e^{-T/\tau})$ $b_2 = T$ $b_3 = T - T_d\tau(e^{-T/\tau}-1)$ $b_4 = T_d + \tau(e^{-T/\tau}-e^{-(T-T_d)/\tau})$ wherein
N denotes a number of total samples used for estimating acceleration coefficients;
$\tau$ denotes a time constant of a power amplifier indicating a time taken from a moment when a control signal is applied to the power amplifier to a moment when a voltage of an output of the power amplifier reaches 63% of the control signal applied thereto;
T denotes a sampling time taken to move a head from a sample to another sample; and
$T_d$ denotes a delayed time taken from a moment when a feedback signal is applied to a moment when the control signal responds to the feedback signal.

17. The settling servo control apparatus of claim 15, wherein the acceleration coefficient identifier estimates acceleration coefficients of the VCM actuator in selected tracks when the head moves a predetermined distance between the selected tracks on a disk and estimates acceleration coefficients in other tracks based on estimated acceleration coefficients in the selected tracks by using linear interpolation.

18. The setting servo control apparatus of claim 17, wherein the acceleration coefficient identifier estimates the acceleration coefficients in the selected tracks when a power of a hard disk drive is turned on.

19. A settling servo control method using a settling servo control apparatus having a state estimator which estimates position information of a head, velocity information of the head, voice coil motor (VCM) current information, and external disturbance information based on a position error signal (PES); a feedback gain multiplier which multiplies the position information of the head and the velocity information of the head respectively by predetermined feedback control gains and outputs the multiplication results as feedback control inputs; a pulse generator which generates a pulse signal used for cancellation of slow poles with reference to at least one of initial VCM current information, initial external disturbance information, and previous control input information, initial position information of the head, and initial velocity information of the head; and an adder which sums the feedback control inputs, the external disturbance information, and the pulse signal generated from the pulse generator and outputs a summation result to a voice coil motor (VCM) actuator as a control input, the settling servo control method comprising:

obtaining a position error signal (PES) indicating a current position of a head when a settling control mode starts;

determining the position information of the head, the velocity information of the head, the VCM current information, and the external disturbance information by inputting the PES to the state estimator;

obtaining control inputs by inputting outputs of the state estimator to the feedback gain multiplier;

during a first sampling period of the PES of the settling control mode, generating a pulse signal used for cancellation of slow poles by inputting the position information of the head, the velocity information of the head, the VCM current information, the external disturbance information, and the previous control input information outputted from the state estimator to the pulse generator, summing the pulse signal, the feedback control inputs outputted from the feedback gain multiplier, and the external disturbance information outputted from the state estimator by the adder, determining a control input, applying the control input, which drives the VCM actuator, to a power amplifier, holding a process until a next sampling period of the PES starts, and going to an operation of obtaining the PES;

during a second sampling period of the PES of the settling control mode, generating a pulse signal used for cancellation of slow poles by inputting the position information of the head, the velocity information of the head, the VCM current information, the external disturbance information, and the previous control input information outputted from the state estimator to the pulse generator, summing the pulse signal, the feedback control inputs outputted from the feedback gain multiplier, and the external disturbance information outputted from the state estimator by the adder, determining a control input, applying the control input, which drives the VCM actuator, to the power amplifier, holding a process until a next sampling period of the PES starts, and going to an operation of obtaining the PES; and during other sampling periods of the PES of the settling control mode, summing the feedback control inputs outputted from the feedback gain multiplier and the external disturbance information outputted from the state estimator by the adder, determining a control input, applying the control input, which drives the VCM actuator, to the power amplifier, holding a process until the next sampling period of the PES starts, and going to an operation of obtaining the PES.

20. The settling servo control method of claim 19, wherein the pulse signal having the amplitude determined based on a first sample of the PES is generated during the second sampling period of the PES of the settling control mode; the pulse signal, the feedback control inputs outputted from the feedback gain multiplier, and the external disturbance information outputted from the state estimator are summed by the adder; a control input are determined; and the control input is applied to the power amplifier.

21. A method of estimating and compensating for acceleration coefficients of a voice coil motor (VCM) actuator of a hard disk drive, the method comprising:

selecting tracks which are separated by a predetermined interval on a disk; and estimating the acceleration coefficients while a head moves between the selected tracks with a VCM current applied to the VCM actuator, wherein the acceleration coefficients of the VCM actuator are estimated in accordance with at least one of a position of the VCM actuator, a direction of a VCM current, or an ambient temperature, and wherein the acceleration coefficients of the VCM actuator in selected tracks are estimated when the head moves a predetermined distance between the selected tracks on a disk, and acceleration coefficients in other tracks are estimated based on the estimated values of the acceleration coefficients in the selected tracks by using linear interpolation.

22. The method of claim 21, wherein the acceleration coefficients are determined as follows, $$\hat{K}_a = \frac{\sum_{n=1}^{N}[\hat{v}(n+1)-\hat{v}(n)][b_1\hat{i}(n)+b_2\hat{\omega}(n)+b_3u(n)+b_4u(n-1)]}{\sum_{n=1}^{N}[b_1\hat{i}(n)+b_2\hat{\omega}(n)+b_3u(n)+b_4u(n-1)]}$$

where $\hat{v}(n)$, $\hat{i}(n)$, and $\hat{\omega}(n)$ each denotes velocity information of the head, VCM current information, and external disturbance information during a $n^{th}$ sampling period of the PES, and coefficients $b_1$, $b_2$, $b_3$, and $b_4$ are defined as follows, $b_1 = \tau(1-e^{-T/\tau})$ $b_2 = T$ $b_3 = T - T_d + \tau(e^{-T/\tau}-1)$ $b_4 = T_d + \tau(e^{-T/\tau}-e^{-T-T_d)/\tau})$ wherein N denotes a number of total samples used for estimating acceleration coefficients;

τ denotes a time constant of a power amplifier indicating a time taken from a moment when a control signal is applied to the power amplifier to a moment when a voltage of an output of the power amplifier reaches 63% of the control signal applied thereto;

T denotes a sampling time taken to move a head from a sample to another sample; and $T_d$ denotes a delayed time taken from a moment when a feedback signal is applied to a moment when the control signal responds to the feedback signal.

23. The method of claim 21, wherein the acceleration coefficients of the VCM actuator are estimated while a direction of the VCM current is changed.

24. The method of claim 21, wherein the acceleration coefficients of the VCM actuator are estimated when a power of the hard disk drive is turned on.

25. The method of claim 21, wherein the method further comprises:

storing an estimated value of an acceleration coefficient in a memory;

estimating position information of a head, velocity information of the head, and VCM current information;

obtaining an acceleration coefficient from the memory with respect to the estimated position information of the head, estimated velocity information of the head, and estimated VCM current information; and multiplying the control input used for the power amplifier to drive the VCM actuator by a ratio of the estimated value of the acceleration coefficient to a representative acceleration coefficient.

26. A hard disk drive comprising:

a state estimator which estimates position information of a head, velocity information of the head, voice coil motor (VCM) current information, and external disturbance information with reference to a position error signal (PES);

a feedback gain multiplier which multiplies the position information of the head and the velocity information of the head respectively by predetermined feedback control gains and outputs the multiplication results as feedback control inputs;

an adder which sums the feedback control inputs, the external disturbance information and a pulse signal generated from a pulse generator and outputs a summation result to a voice coil motor (VCM) actuator as a control input;

an acceleration coefficient identifier which estimates acceleration coefficients of the VCM actuator with reference to the velocity information of the head, the VCM current information, and the external disturbance information estimated by the state estimator, and the previous control input information, or outputs an estimated value of the acceleration coefficient; and an acceleration coefficient compensator which compensates for variation in the acceleration coefficients by multiplying the control input outputted from the adder by a ratio of an estimated value of the acceleration coefficient to a representative acceleration coefficient that is a ratio of $\hat{K}_{a \ to \ K^*a}$.

27. The hard disk drive of claim 26, wherein the acceleration coefficients are determined as follows, $$\hat{K}_a = \frac{\sum_{n=1}^{N}[\hat{v}(n+1)-\hat{v}(n)][b_1\hat{i}(n)+b_2\hat{\omega}(n)+b_3u(n)+b_4u(n-1)]}{\sum_{n=1}^{N}[b_1\hat{i}(n)+b_2\hat{\omega}(n)+b_3u(n)+b_4u(n-1)]}$$

where $\hat{v}(n)$, $\hat{i}(n)$, and $\hat{\omega}(n)$ each denotes velocity information of the head, VCM current information, and external disturbance information during a $n^{th}$ sampling periods of the PES, and coefficients $b_1$, $b_2$, $b_3$, and $b_4$ are defined as follows, $b_1 = \tau(1-e^{-T/\tau})$ $b_{2=T}$ $b = T - T_d + \tau(e^{-T/\tau}-1)$ $b_4 = T_d + \tau(e^{-(T-T_d)/\tau})$ wherein N denotes a number of total samples used for estimating acceleration coefficients;

τ denotes a time constant of a power amplifier indicating a time taken from a moment when a control signal is applied to the power amplifier to a moment when a voltage of an output of the power amplifier reaches 63% of the control signal applied thereto;

T denotes a sampling time taken to move a head from a sample to another sample; and $T_d$ denotes a delayed time taken from a moment when a feedback signal is applied to a moment when the control signal responds to the feedback signal.

28. The hard disk drive of claim 26, wherein the acceleration coefficient identifier estimates acceleration coefficients of the VCM actuator in selected tracks when the head moves a predetermined distance between the selected tracks on a disk and estimates acceleration coefficients in other tracks based on estimated values of the acceleration coefficients in the selected tracks by using linear interpolation.

29. The hard disk drive of claim 26, wherein the acceleration coefficients of the VCM actuator are estimated while a direction of the VCM current is changed.

30. The hard disk drive of claim 26, wherein the acceleration coefficients of the VCM actuator are estimated when a power of the hard disk drive is turned on.

31. A method of controlling a servo of a hard disk drive, the method comprising:

moving a head among selected tracks on a disk obtaining a position error signal (PES) and generating a control input used to drive a voice coil motor (VCM) actuator by obtaining position information of the head, velocity information of the head, and external disturbance information estimated by a state estimator based on the PES;

if an acceleration coefficient estimation mode is set, multiplying the control input by 1, applying the multiplication result to the VCM actuator, storing velocity information of the head, VCM current information, external disturbance information, previous control input information, and a control input, which are used for estimation of an acceleration coefficient and are obtained from the state estimator, in a memory, estimating the acceleration coefficient by using N data samples used for estimation, and storing the estimated value of the acceleration coefficient in the memory;

if estimation of the acceleration coefficient is completed in all selected tracks, finishing the acceleration coefficient estimation mode;

if the acceleration coefficient estimation mode is not set, reading the estimated value of the acceleration coefficient in a current track from the memory so as to compensate for variation in the acceleration coefficient; and multiplying the control input by a ratio of the estimated value of the acceleration coefficient to a representative acceleration coefficient and applying the multiplication result to the VCM actuator.

32. An effective settling servo control apparatus for a hard disc drive to estimate an acceleration coefficient of a voice coil motor (VCM) actuator to allow a head to stably and rapidly move to a target track when a track seek operation is performed in the hard disk drive, the settling servo control apparatus comprising:

a feedback control input generator to estimate position information of a head, velocity information of the head, voice coil motor (VCM) current information, and external disturbance information based on a position error signal (PES) and multiply the position information of the head and the velocity information of the head by predetermined feedback control gains and to output multiplication results as feedback control inputs;

a pulse generator to generate a pulse signal to cancel slow poles in accordance with at least one of initial VCM current information, initial external disturbance information, and previous control input information, initial position information of the head or initial velocity information of the head; and an adder to sum the feedback control inputs, the external disturbance information, and the pulse signal generated from the pulse generator and to output a summation result to the VCM actuator as a control input.

* * * * *

UNITED STATES PATENT AND TRADEMARK OFFICE
CERTIFICATE OF CORRECTION

| | |
|---|---|
| PATENT NO. | : 7,203,028 B2 |
| APPLICATION NO. | : 10/462803 |
| DATED | : April 10, 2007 |
| INVENTOR(S) | : Da-woon Chung et al. |

It is certified that error appears in the above-identified patent and that said Letters Patent is hereby corrected as shown below:

On The Title page, Item (75), Inventors, Line 3, after "Chan-" change "hyuck" to --hyuk--.

Column 20, Line 37, change

"$\Phi = k_{sx}\hat{x}(0) + \hat{v}\ k_{sv}(0) + \hat{i}\ k_{si}(0) + \hat{1}\hat{0}\hat{7}\ k_{s\omega}(0)\ \hat{u} + k_{su}(-1)$" to --$\Phi = k_{sx}\ \hat{x}(0) + k_{sv}\ \hat{v}(0) + k_{si}\ \hat{i}(0) + k_{s\omega}\ \hat{\omega}(0) + k_{su}\ \hat{u}(-1)$ --.

Column 21, Line 46, after " $u_s(n) = \Phi\ \delta(n)$ " insert --,--.

Column 22, Line 22, change "information" to --information,--.

Column 22, Line 32, change "$k_{sw,}$" to --$k_{sw}$,--.

Column 22, Line 52, change " $\hat{1}\hat{0}\hat{7}(0),$ " to -- $\hat{\omega}(0),$ --.

Column 25, Line 36, change

" $b_4 = T_d + \tau(e^{-T/\tau} - e^{T-T_d)/\tau})$ " to

-- $b_4 = T_d + \tau(e^{-T/\tau} - e^{-(T-T_d)/\tau})$ --.

Column 26, Line 17, change "information" to --information,--.

Column 27, Line 19, change "disk" to --disk;--.

Signed and Sealed this

Thirty-first Day of July, 2007"

JON W. DUDAS
*Director of the United States Patent and Trademark Office*